(12) United States Patent
Northrup et al.

(10) Patent No.: US 11,274,718 B2
(45) Date of Patent: Mar. 15, 2022

(54) ACTIVE BRAKE CONFIRMATION FOR ACTIVE TRANSFER CASES

(71) Applicant: MAGNA POWERTRAIN OF AMERICA, INC., Troy, MI (US)

(72) Inventors: Benjamin Northrup, Bloomfield Hills, MI (US); Opinder Sharma, Rochester Hills, MI (US)

(73) Assignee: MAGNA POWERTRAIN OF AMERICA, INC., Troy, MI (US)

( * ) Notice: Subject to any disclaimer, the term of this patent is extended or adjusted under 35 U.S.C. 154(b) by 33 days.

(21) Appl. No.: 16/585,390

(22) Filed: Sep. 27, 2019

(65) Prior Publication Data

US 2020/0109753 A1 Apr. 9, 2020

Related U.S. Application Data

(60) Provisional application No. 62/742,599, filed on Oct. 8, 2018.

(51) Int. Cl.
| | |
|---|---|
| *F16D 67/02* | (2006.01) |
| *B60K 17/344* | (2006.01) |
| *F16D 66/00* | (2006.01) |
| *B60Q 9/00* | (2006.01) |
| *F16D 67/06* | (2006.01) |

(52) U.S. Cl.
CPC ............ *F16D 66/00* (2013.01); *B60K 17/344* (2013.01); *B60Q 9/00* (2013.01); *F16D 67/02* (2013.01); *F16D 67/06* (2013.01)

(58) Field of Classification Search
CPC .......... F16D 2500/50245–50254; F16D 67/02; B60K 17/344; B60K 17/342; B60K 17/3467; B60K 17/3462
See application file for complete search history.

(56) References Cited

U.S. PATENT DOCUMENTS

| | | | |
|---|---|---|---|
| 6,808,053 B2 | 10/2004 | Kirkwood et al. | |
| 7,101,310 B2 | 9/2006 | Smith et al. | |
| 7,399,251 B2* | 7/2008 | Mueller | B60K 17/3467 475/204 |
| 7,445,581 B2 | 11/2008 | Cring | |
| 7,694,598 B2 | 4/2010 | Kriebernegg et al. | |
| 9,568,091 B2 | 2/2017 | Drill et al. | |
| 10,059,201 B2 | 8/2018 | Ekonen et al. | |
| 10,330,183 B2 | 6/2019 | McNalley et al. | |
| 2005/0096172 A1* | 5/2005 | Mueller | F16D 23/12 475/204 |
| 2006/0162980 A1* | 7/2006 | Bowen | B60K 23/04 180/247 |
| 2016/0363201 A1* | 12/2016 | McNally | F16H 57/043 |
| 2018/0147939 A1* | 5/2018 | Sharma | B60K 17/3467 |

* cited by examiner

*Primary Examiner* — Ernesto A Suarez
*Assistant Examiner* — Lillian T Nguyen
(74) *Attorney, Agent, or Firm* — Dickinson Wright PLLC

(57) ABSTRACT

An active transfer case is equipped with a multi-plate clutch assembly, a clutch actuation mechanism configured to selectively engage the clutch assembly, a power-operated clutch actuator configured to control actuation of the clutch actuation mechanism, a power-operated actuator brake associated with the power-operated clutch actuator, and a control system configured to control actuation of the clutch actuator and the actuator brake while employing a preemptive check of the functionality of the actuator brake.

21 Claims, 13 Drawing Sheets

ACTIVE BRAKE CONFIRMATION FOR ACTIVE TRANSFER CASES

CROSS-REFERENCE TO RELATED APPLICATION

This application claims the benefit of and priority to U.S. Provisional Patent Application Ser. No. 62/742,599 filed on Oct. 8, 2018, the entire disclosure of which is hereby incorporated by reference.

FIELD

The present disclosure relates generally to power transfer systems for controlling the distribution of drive torque from a powertrain to the front and rear drivelines of a four-wheel drive motor vehicle. More particularly, the present disclosure is directed to an active transfer case equipped with a multi-plate clutch assembly, a clutch actuation mechanism configured to selectively engage the clutch assembly, a power-operated clutch actuator configured to control actuation of the clutch actuation mechanism, a power-operated actuator brake associated with the power-operated clutch actuator, and a control system configured to control actuation of the clutch actuator and the actuator brake while employing a preemptive check of the functionality of the actuator brake.

BACKGROUND

This section provides background information related to the present disclosure which is not necessarily prior art.

In view of increased consumer popularity in four-wheel drive vehicles, power transfer systems are currently being utilized in vehicular drivetrain applications for selectively directing power (i.e., drive torque) from the powertrain to all four wheels of the vehicle. In many power transfer systems, a transfer case is incorporated into the drivetrain and is operable in a four-wheel drive mode for delivering drive torque from the powertrain to both the front and rear wheels. Many conventional transfer cases are equipped with a mode shift mechanism that can be selectively actuated to shift between a two-wheel drive mode and a locked four-wheel drive mode. In addition, many transfer cases also include a range shift mechanism which can be selectively actuated by the vehicle operator for shifting between four-wheel high-range and low range drive modes.

It is also known to use "on-demand" power transfer systems for automatically distributing drive torque between the front and rear wheels, without any input or action on the part of the vehicle operator, when traction is lost at either the front or rear wheels. Modernly, it is known to incorporate the "on-demand" feature into a transfer case by replacing the mechanically-actuated mode shift mechanism with a multi-plate clutch assembly, a clutch actuation mechanism and a power-operated clutch actuator that is interactively associated with an electronic control system and a sensor arrangement. During normal road conditions, the clutch assembly is typically maintained in a released condition such that drive torque is only delivered to the rear wheels. To establish the released condition of the multi-plate clutch assembly, the power-operated clutch actuator is commanded by the control system to move the clutch actuation mechanism to a non-actuated position for disengaging the multi-plate clutch assembly. However, when the sensors detect a low traction condition, the clutch actuator is actuated by the control system to move the clutch actuation mechanism from its non-actuated position to an actuated position which, in turn, engages the clutch assembly for transmitting drive torque to the front wheels. Moreover, the amount of drive torque transferred through the clutch assembly to the front wheels can be varied as a function of specific vehicle dynamics and operating characteristics, as detected by the sensor arrangement.

Many current active transfer cases are configured to include a rear output shaft interconnecting the transmission output to the rear driveline, a front output shaft interconnected to the front driveline, a transfer assembly interconnected to the front output shaft, and the clutch assembly which is operably arranged to couple the transfer assembly to the rear output shaft for transmitting drive torque to the front driveline. Typically, the transfer assembly includes a first sprocket rotatably supported on the rear output shaft, a second sprocket fixed to the front output shaft, and a chain encircling and drivingly interconnecting the first sprocket for common rotation with the front output shaft. The clutch assembly and components of the power-operated clutch actuator are disposed to surround the rear output shaft and function to couple the first sprocket to the rear output shaft.

In the past, the vehicle ride height and suspension configuration of many trucks and sport utility vehicles provided sufficient packaging volume for such traditional active transfer cases. However, in view of increased demand for smaller four-wheel drive vehicles, the packaging volume allocated to the powertrain and the active transfer case has been greatly reduced. As such, some active transfer cases have been developed which position the clutch assembly, the clutch actuation mechanism and the power-operated clutch actuator on the front output shaft.

Regardless of the location of the multi-plate clutch assembly, many active transfer cases are also equipped with a power-operated actuator brake which is normally operable in a power-off condition to brake movement of a component associated with one of the clutch actuation mechanism and the power-operated clutch actuator. This braking function acts to maintain the multi-plate clutch assembly in its current torque-transmitting condition while allowing the electrical power to the clutch actuator to be turned off. The use of such a power-off actuator brake permits reduction in the power-on use of the clutch actuator, particularly during time periods of continuous and constant torque transfer requirements. The control system coordinates actuation of the clutch actuator and the actuator brake to provide this clutch-holding feature.

If an electrical or mechanical malfunction of the actuator brake occurs, the software associated with the control system may not recognize the malfunction until actuation of the actuator brake is actually required. Common electrical actuator brake circuit diagnostics are configured to identify changes in voltage within the actuator brake control circuit which are indicative of a total loss of actuator brake controllability. However, on their own, conventional actuator brake circuit diagnostics do not provide full coverage over all potential malfunction detection conditions. For example, the actuator brake could be mechanically faulty and the circuit diagnostics would not detect this condition.

Typically, active transfer cases equipped with an actuator brake have control systems utilizing "passive" functional software diagnostics. A first passive functional diagnostic monitors movement of a component within the clutch actuator (or the actuation mechanism) when engagement of the actuator brake is requested and the clutch actuator is not energized. Commonly, this diagnostic acts to monitor rotation of the electric motor output shaft. Detection of such movement in this scenario could indicate that the actuator brake is not mechanically holding the braked components in a stationary manner. A second passive functional diagnostic is configured to monitor for lack of movement when the control system requests release of the actuator brake and the clutch actuator is energized. Detection of movement in this scenario could indicate that the actuator brake is malfunctioning by failing to disengage when requested.

The addition of these passive functional software diagnostics improves overall coverage of malfunction detection. However, because they are passive in nature, they are only capable of identifying when the actuator brake functionality has already been compromised and available options for subsequent corrective action are limited.

Therefore, a need exists to further supplement such passive functional diagnostic with an "active" or preemptive check of the actuator brake's functionality. Such an active brake functionality check permits the software to take additional action and/or notify the vehicle operator of compromised 4WD functionality before the vehicle is operated in a potentially unsafe situation.

SUMMARY

This section provides a general summary of the disclosure and is not intended to be interpreted as a complete and comprehensive disclosure of all of its features, advantages, objectives and aspects.

It is an aspect of the present disclosure to provide an active transfer case for use in four-wheel drive vehicles that is operable to transmit drive torque through a multi-plate friction clutch assembly.

It is a related aspect of the present disclosure to provide an active transfer case equipped with a multi-plate clutch assembly, a clutch actuation mechanism configured to selectively engage the clutch assembly, a power-operated clutch actuator configured to control actuation of the clutch actuation mechanism, a power-operated actuator brake configured to brake movement of a component associated with one of the clutch actuation mechanism and the clutch actuator, and a control system configured to control coordinated actuation of the clutch actuator and the actuator brake while employing a preemptive or "active" functional diagnostic (i.e. active brake check) to check the functionality of the actuator brake.

It is another related aspect to employ the active functionality check such that the control system is enabled to take additional action and/or notify the vehicle operator of a compromised 4WD transfer case functionality before the vehicle is operated in an unsafe situation. Specifically, the addition of an active brake check increases the ability of the active transfer case's control system (commonly, the transfer case control module or "TTCM") to diagnose and detect hardware malfunctions.

It is another aspect of the present disclosure to pair the active brake check with one or more passive diagnostics to provide enhanced brake malfunction detection and coverage.

In view of these and other aspects and objectives of the present disclosure, an active transfer case is provided which is configured for use in a 4WD motor vehicle to permit "on-demand" transfer of drive torque from a powertrain to front and rear drivelines. The active transfer case includes an input shaft adapted to receive drive torque from the powertrain, a rear output shaft adapted for connection to the rear driveline and configured to be driven by the input shaft, a front output shaft adapted for connection to the front driveline, and a transfer mechanism driven by one of the front and rear output shafts. The active transfer case also includes a multi-plate clutch assembly disposed between the transfer mechanism and the other one of the front and rear output shafts, a clutch actuation mechanism operable to selectively apply a clutch engagement force to the clutch assembly, a power-operated clutch actuator operable to actuate the clutch actuation mechanism, a power-operated actuator brake operable to selectively brake a moveable component associated with one of the clutch actuation mechanism and the clutch actuator, and a control system operable to control coordinated actuation of both the clutch actuator and the actuator brake. The control system configured to conduct a preemptive or "active" brake functionality check to determine the functionality of the actuator brake.

The power-operated clutch actuator includes an electric motor having a motor shaft driving a gearset which is configured to convert rotation of the motor shaft into translational movement of a component associated with the clutch actuation mechanism for generating the clutch engagement force applied to the clutch assembly. The power-operated clutch brake is operable in a power-on released state to permit rotation of the motor shaft and in a power-off engaged state to brake rotation of the motor shaft. The active functionality check associated with the control system includes energizing the electric motor while the actuator brake is maintained in its power-off engaged state and detecting whether the motor shaft has rotated from its braked position. Detection of no shaft rotation is indicative that the actuator brake has normal functionality while detection of shaft rotation is indicative of the actuator brake having abnormal functionality such as a malfunction.

In accordance with a method of the present disclosure, the control system for the active transfer case provides the following actuator brake diagnostic steps: release the brake actuator and energize the electric motor so as to rotate the motor shaft to a desired position; determine the desired position (P1) of the motor shaft; engage the actuator brake to brake the motor shaft; determine the actual position (P2) of the motor shaft; calculate a first difference value (P1−P2) and compare the first difference value to preselected threshold value; conduct the active brake check by energizing the electric motor while the actuator brake remains engaged; determine check position value (P3) of the motor shaft; calculate a second difference value (P1−P3) and compare the second difference value to the threshold value; and notify the vehicle operator of an actuator brake malfunction if the second difference value (P1−P3) is greater than the threshold value.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
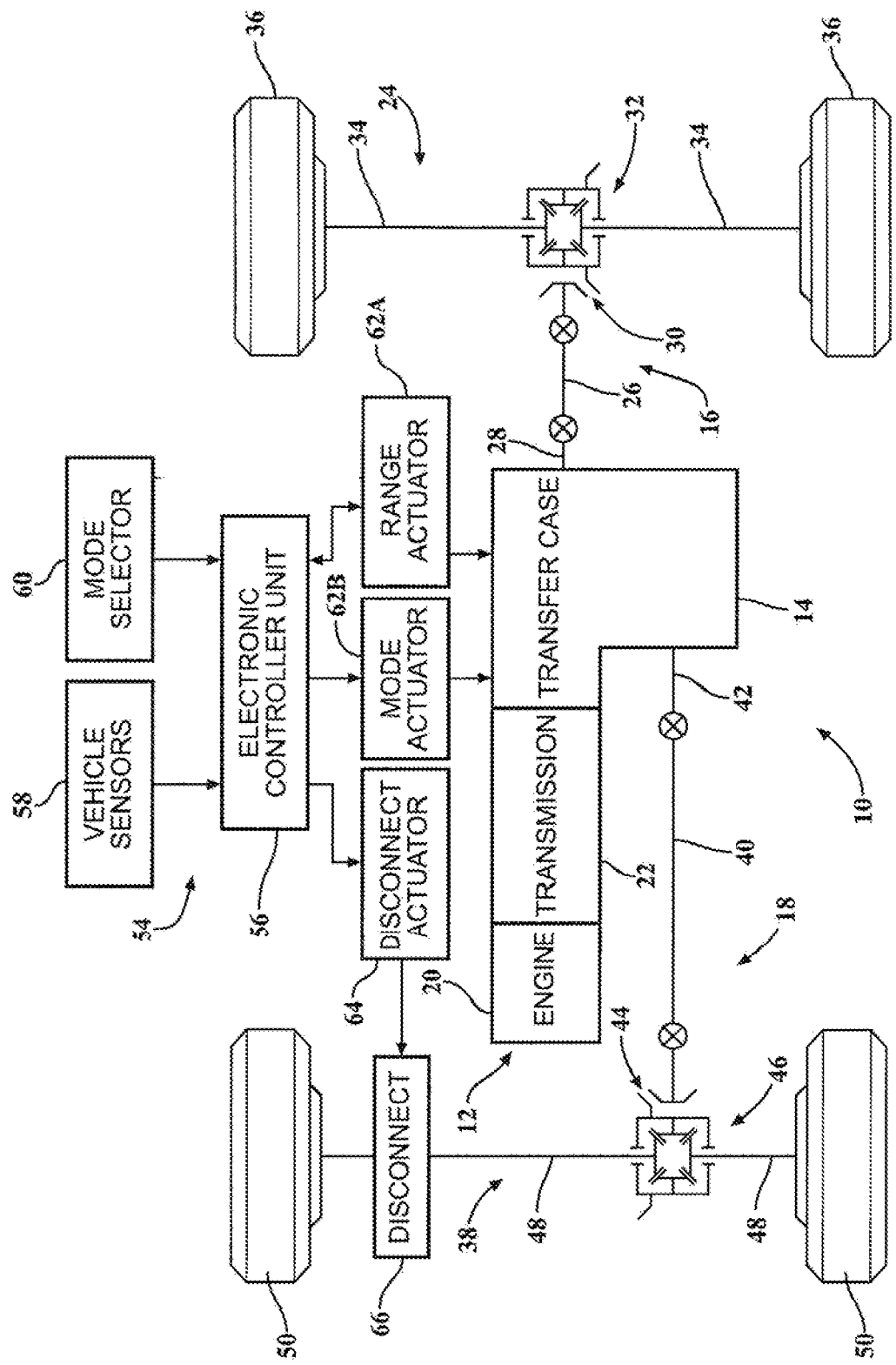
FIG. 1 is a schematic illustration of a four-wheel drive motor vehicle equipped with a power transfer system having a two-speed active transfer case constructed in accordance with the teachings of the present disclosure.

Example embodiments will now be described more fully with reference to the accompanying drawings. In particular, at least five example embodiments of an active transfer case adapted for use with four-wheel drive vehicles are provided so that this disclosure will be thorough and will fully convey the true and intended scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "compromises," "comprising," "including," and "having," are inclusive and therefore specify the presence of stated features, integers, steps, operations, elements, and/or components, but do not preclude the presence or addition of one or more other features, integers, steps operations, elements, components, and/or groups or combinations thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Referring initially to FIG. 1 of the drawings, an example drivetrain for a four-wheel drive motor vehicle 10 is shown to include a powertrain 12 operable to generate rotary power (i.e., drive torque) which is transmitted through a power transfer unit, hereinafter active transfer case 14, to a primary driveline 16 and to a secondary driveline 18. Powertrain 12 is shown, in this non-limiting example, to include a power source such as an internal combustion engine 20 and a transmission 22. In the particular arrangement shown, primary driveline 16 is a rear driveline and generally includes a rear axle assembly 24 and a rear propshaft 26 arranged to drivingly interconnect a rear output shaft 28 of active transfer case 14 to an input of rear axle assembly 24. The input to rear axle assembly 24 includes a hypoid gearset 30 connected to rear propshaft 26. Rear axle assembly 24 includes a rear differential assembly 32 driven by hypoid gearset 30, and a pair of rear axleshafts 34 interconnecting rear differential assembly 32 to a pair of ground-engaging rear wheels 36. Secondary driveline 18 is a front driveline and includes a front axle assembly 38 and a front propshaft 40 arranged to drivingly interconnect a front output shaft 42 of active transfer case 14 to an input of front axle assembly 38. The input to front axle assembly 38 includes a hypoid gearset 44 connected to front propshaft 40. Front axle assembly 38 includes a front differential assembly 46 driven by hypoid gearset 44, and a pair of front axleshafts 48 interconnecting front differential assembly 46 to a pair of ground-engaging front wheels 50.

Motor vehicle 10 is also shown to include a control system 54 having an electronic controller unit 56 configured to receive input signals from vehicle sensors 58 and a mode selector 60 and to subsequently provide control signals to one or more actuators. Mode selector 60 is, in this non-limiting example, a manually-operable device within the passenger compartment of vehicle 10 and, for example, may include a shift lever. Controller unit 56 can provide control signals to one or more transfer case actuators 62 and an axle disconnect actuator 64. As will be detailed with greater specificity, the at least one transfer case actuators 62 may include a range actuator 62A associated with a two-speed range mechanism to provide high-range and low-range drive connections, and/or a mode actuator 62B associated with a mode mechanism to provide two-wheel drive and four-wheel drive modes of operation.

In the particular embodiments of active transfer case 14 to be described hereinafter, mode selector 60 signals ECU 56 to operate range actuator 62A which, in turn, controls operation of the two-speed range shift mechanism. Range actuator 62A, in such embodiments, provides a range signal to ECU 56 that is indicative of the particular drive connection (namely, the high-range or the low-range) selected and established. Disconnect actuator 64 controls operation of a disconnect device 66 associated with front axle assembly 38 for selectively coupling and uncoupling front driveline 18 relative to active transfer case 14. Sensors 58 are configured to provide information to ECU 56 indicative of the current operational characteristics of vehicle 10 and/or road conditions for use in controlling operation of active transfer case 14. The information provided by sensors 58 may include, without limitations, information related to vehicle speed, driveline/wheel speeds, acceleration, braking status, steering angle, throttle position, lateral displacement, and/or rain sensors. Mode selector 60 permits a vehicle operator to select operation of vehicle 10 in one of the available drive modes which may include, without limitation, a two-wheel high-range (2WH) drive mode, an "on-demand" four-wheel high-range (AUTO-4WH) drive mode, a locked four-wheel high-range (LOCK-4WH) drive mode, a Neutral mode, a locked four-wheel low-range (LOCK-4WL) drive mode, and an "on-demand" four-wheel low-range (AUTO-4WL) drive mode.

Figure 2A:
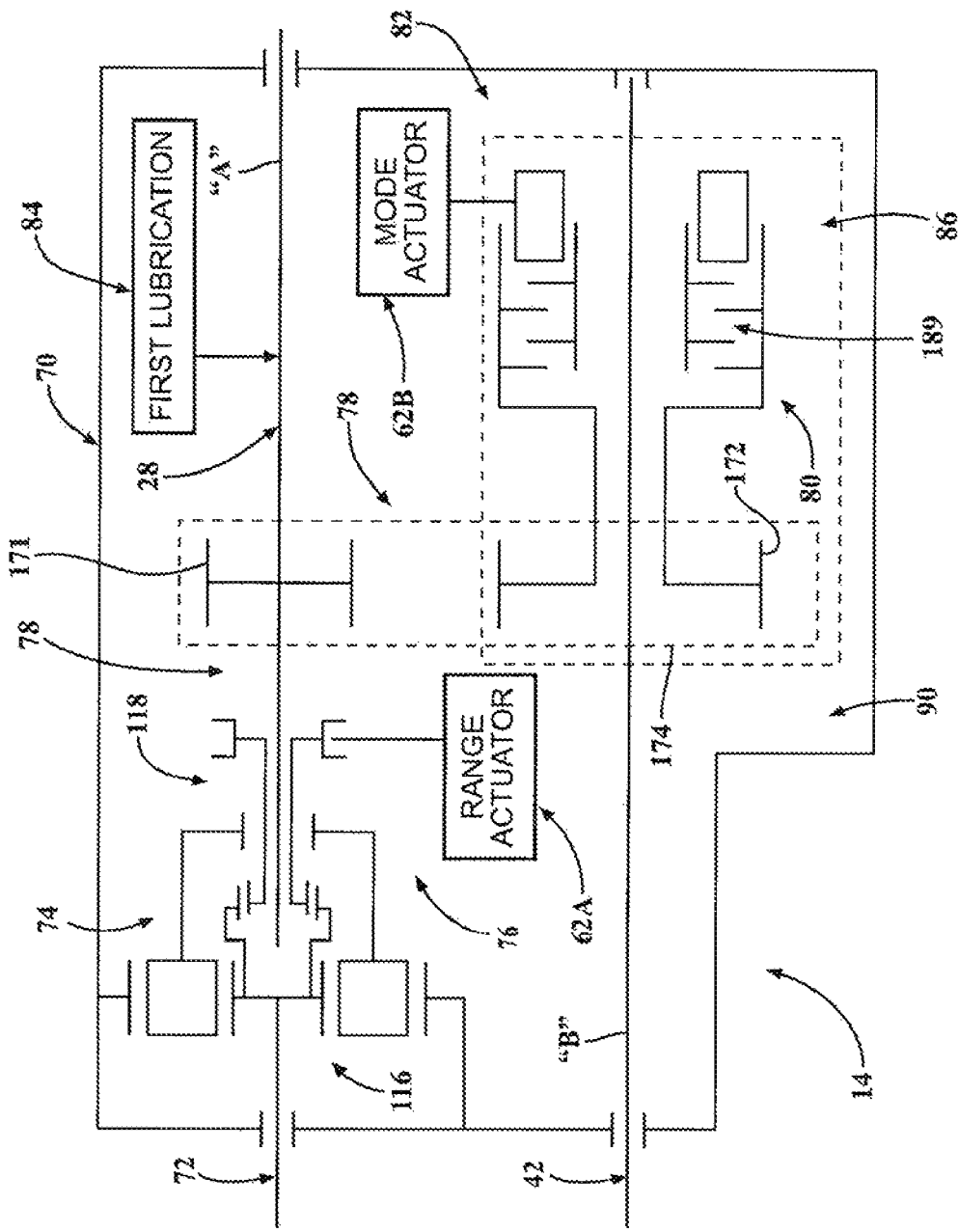
FIG. 2A is a diagrammatical illustration of a two-speed active transfer case having an adaptively-controlled multi-plate friction clutch assembly associated with its front output shaft and which embodies the teachings of the present disclosure.
Figure 2B:
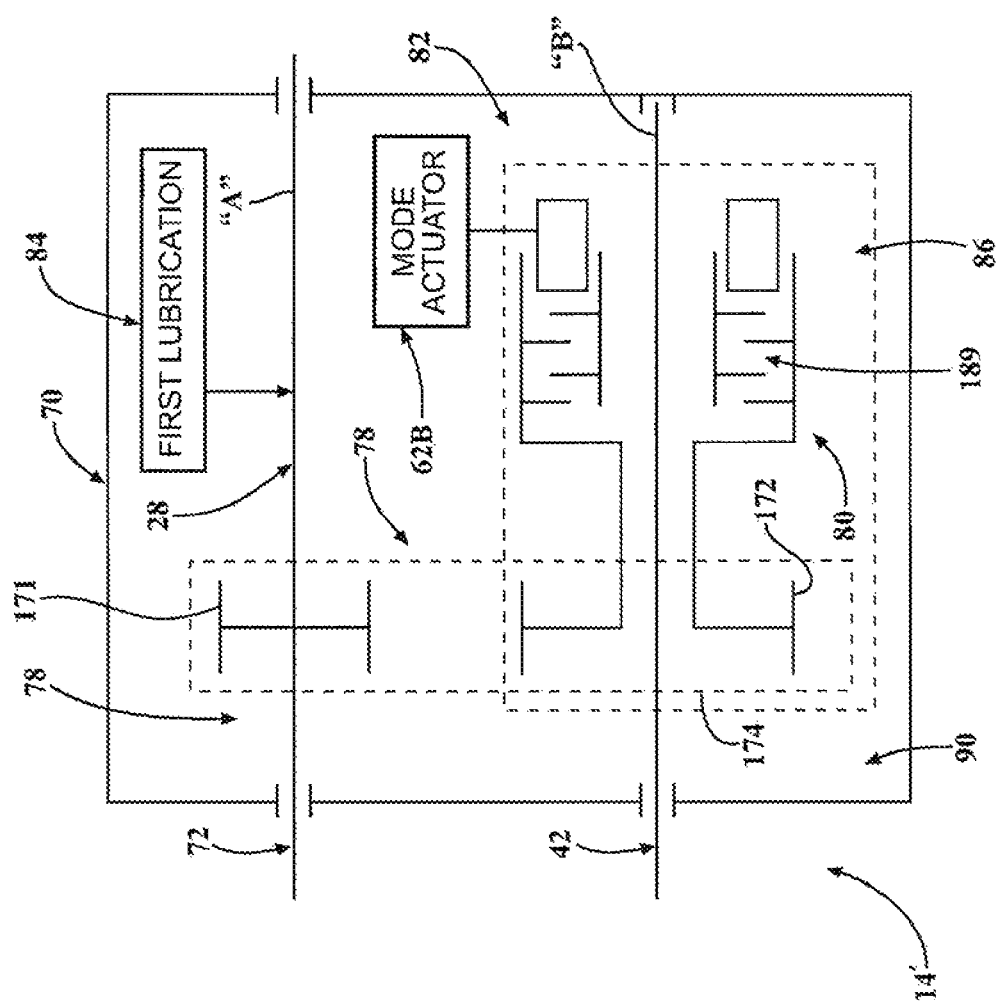
FIG. 2B is a diagrammatical illustration of a one-speed version of an active transfer case based on the two-speed active transfer case of FIG. 2A.

Referring now to FIG. 2A of the drawings, a stick diagram of an example embodiment of active transfer case 14 is provided. Active transfer case 14 is generally shown to include: a housing assembly 70; an input shaft 72 rotatably supported by housing assembly 70; a two-speed range mechanism 74 disposed between input shaft 72 and rear output shaft 28; a range actuation mechanism 76 controlling operation of two-speed range mechanism 74; a transfer mechanism 78 driven by rear output shaft 28; a mode mechanism 80 disposed between transfer mechanism 78 and front output shaft 42; a mode actuation mechanism 82 controlling operation of mode mechanism 80; a first lubrication mechanism 84 associated with rear output shaft 28; and a second lubrication mechanism 86 (shown in phantom lines) associated with front output shaft 42. As is evident, range mechanism 74 is arranged in association with a first rotary axis "A" of active transfer case 14 while mode mechanism 80 is arranged in association with a second rotary axis "B" of active transfer case 14. With active transfer case 14 installed in vehicle 10, the first axis is generally parallel but offset above the second axis with housing assembly 70 configured to define a sump area 90 filled with a lubricating oil in an area generally configured to locate at least a portion of mode mechanism 80 within sump area 90. Active transfer case 14 is also shown in FIG. 2A to include power-operated range actuator 62A in association with range actuation mechanism 76, and power-operated mode actuator 62B in association with mode actuation mechanism 80, both of which are controlled by ECU 56. While active transfer case 14 is shown to be directed to a two-speed version based on inclusion of range mechanism 74 and range actuation mechanism 76, it will be understood that a one-speed version of active transfer case 14 is intended to be within the scope of this disclosure. To better illustrate the contemplated arrangement, a one-speed version of active transfer case 14 is shown in FIG. 2B and is identified by reference number 14'.

Figure 3:
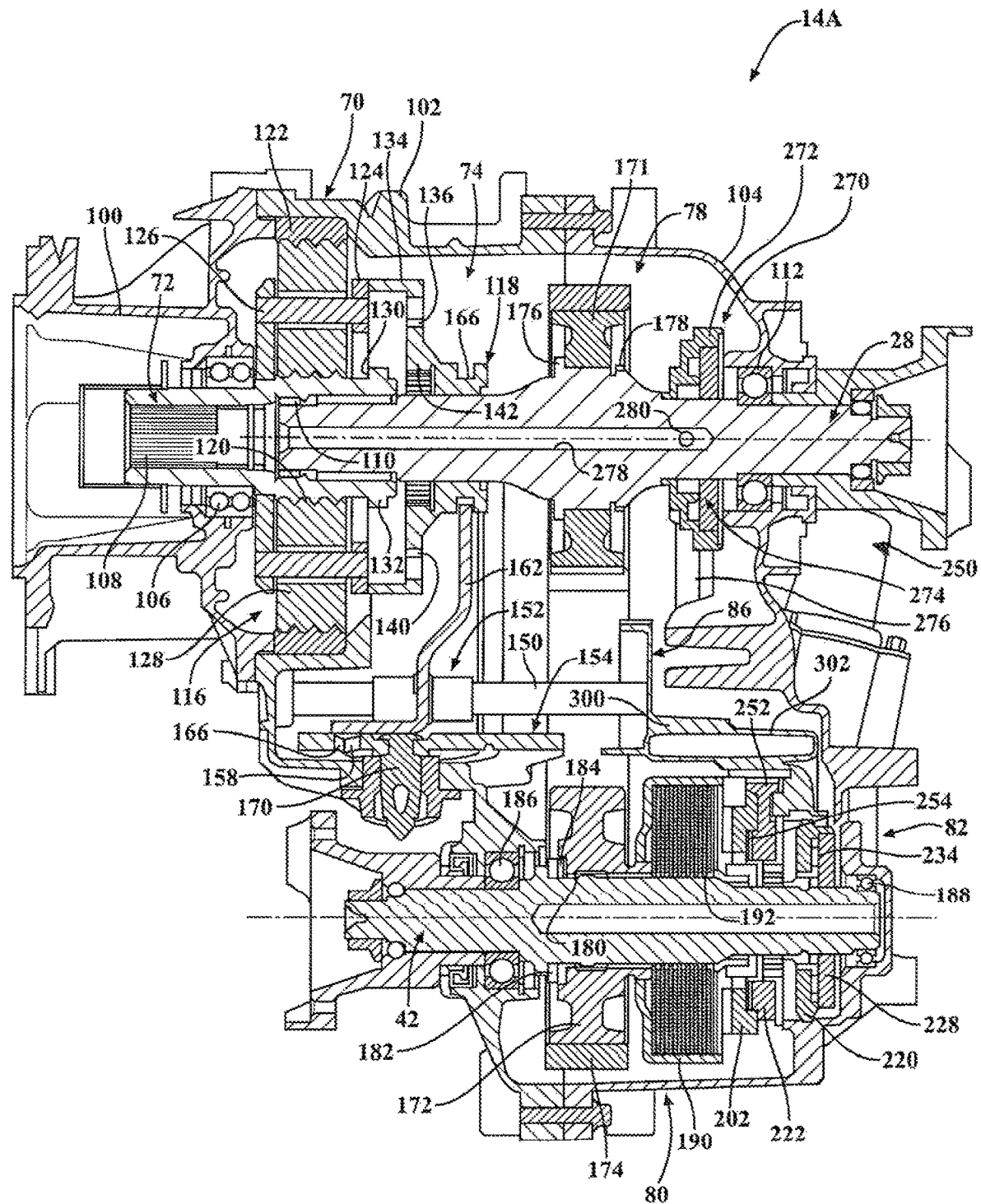
FIG. 3 is a sectional view of the two-speed active transfer case constructed in accordance with one embodiment of the present disclosure.

With particular reference now to FIG. 3, a first embodiment of active transfer case 14 originally shown in FIGS. 1 and 2, is identified by reference numeral 14A. Housing assembly 70 is shown, in this non-limiting example, to include a multi-piece configuration having an adapter housing section 100, a front housing section 102, a rear housing section 104, and a rear end cap 105. Adapter housing section 100 is configured to be rigidly secured to transmission 22 and includes a bearing assembly 106 rotatably supporting input shaft 72. Input shaft 72 includes internal splines 108 adapted to matingly engage with external splines of a transmission output shaft. Rear output shaft 28 is supported for rotation relative to input shaft 72 by a first bearing assembly 110 disposed between input shaft 72 and rear output shaft 28, and a second bearing assembly 112 disposed between rear housing section 104 and rear output shaft 28.

Range mechanism 74 is shown, in this non-limiting embodiment, to include a planetary gearset 116 and a range clutch 118. Planetary gearset 116 includes a sun gear 120 formed integrally on input shaft 72, a ring gear 122 non-rotatably fixed to front housing section 102, a carrier unit 124 having a plurality of pins 126, and a plurality of planet gears 128 each rotatably mounted (via a bearing assembly) on a corresponding one of pins 126 and which are each in constant meshed engagement with sun gear 120 and ring gear 122. Input shaft 72 includes a clutch ring segment 130 having external clutch teeth 132 formed thereon. Carrier unit 124 includes a clutch ring segment 134 having internal clutch teeth 136 formed thereon. Range clutch 118 is configured as a sliding range collar that is splined for common rotation with rear output shaft 28. Range collar 118 also includes external clutch teeth 140 and internal clutch teeth 142. Range clutch 118 is axially moveable on rear output shaft 28 between three (3) distinct range positions.

Range collar 118 is moveable between a high-range (H) position, a neutral (N) position, and a long-range (L) position. When range collar 118 is located in its H range position, its internal clutch teeth 142 engage external clutch teeth 132 on input shaft 72 so as to establish a first or "direct" (i.e., high-range) speed ratio drive connection between input shaft 72 and rear output shaft 28. In contrast, when range collar 118 is located in its L range position, its external clutch teeth 140 engage internal clutch teeth 136 on carrier unit 124 so as to establish a second or "reduced" (i.e., low-range) speed ratio drive connection between input shaft 72 and rear output shaft 28. Location of range collar 118 in its N position disengages rear output shaft 28 from driven connection with input shaft 72 and carrier unit 124 so as to interrupt the transfer of drive torque and permit relative rotation therebetween. Accordingly, the high-range drive connection is established when range collar 118 is located in its H range position and the low-range drive connection is established when range collar 118 is located in its L range position. The two-speed range mechanism shown and described is intended to exemplify any suitable gear reduction device capable of establishing two distinct speed ratio drive connections between input shaft 72 and rear output shaft 42.

Range actuation mechanism 76 is shown, in the non-limiting embodiment, to include a shift rail 150 mounted between front and rear housing sections 102 and 104 of housing assembly 70, a range fork unit 152 slideably disposed on shift rail 150, and a rotary sector plate 154 having a contoured range slot 156 within which a range pin 158 extends. Range pin 158 extends outwardly from a tubular hub segment 160 of range fork unit 152 such that rotation of sector plate 154 causes linear movement of range fork unit 152 due to range pin 158 moving within range slot 156. Range fork unit 152 further includes a fork segment 162 extending outwardly from hub segment 160 and having a pair of bifurcated forks 164 that are retained in an annular groove 166 formed in range collar 118. Therefore, axial movement of range fork unit 152 results in sliding movement of range collar 118 between its three distinct range positions. While not specifically shown, the power-operated version of range actuator 62A may include an electric motor for rotatably driving a sector shaft 170 that is, in turn, coupled to sector plate 154 so as to move range collar 118 into the desired range position in response to rotation of sector shaft 170. Those skilled in the art will appreciate that any suitable arrangement capable of axially moving range fork unit 152 to facilitate movement of range collar 118 between its three (3) distinct range positions is within the meaning of range actuator 92.

Transfer mechanism 78 is shown in the non-limiting example, to include a first transfer component driven by rear output shaft 28 and which is arranged to transfer drive torque to a second transfer component rotatably supported on front output shaft 42. Transfer mechanism 78 is a chain and sprocket type of drive assembly including a first sprocket 171 acting as the first transfer component, a second sprocket 172 acting as the second transfer component, and a power chain 174 encircling first sprocket 171 and second sprocket 172. First sprocket 171 is splined for common rotation with rear output shaft 28 and is axially retained between a radial flange 176 and a snap-ring 178. Second sprocket 172 is rotatably mounted on front output shaft 42 via a needle bearing assembly 180. A retainer ring 182 and a radial thrust bearing assembly 184 are also disposed between second sprocket 172 and front output shaft 42. Front output shaft 42 is rotatably supported by housing assembly 70 via a pair of laterally-spaced roller bearing units 186 and 188. It is contemplated that alternative transfer mechanisms, such as gear drive arrangements, can be used with active transfer case 14A to transfer drive torque from rear output shaft 28 to a transfer component rotatably supported on front output shaft 42.

Figure 7:
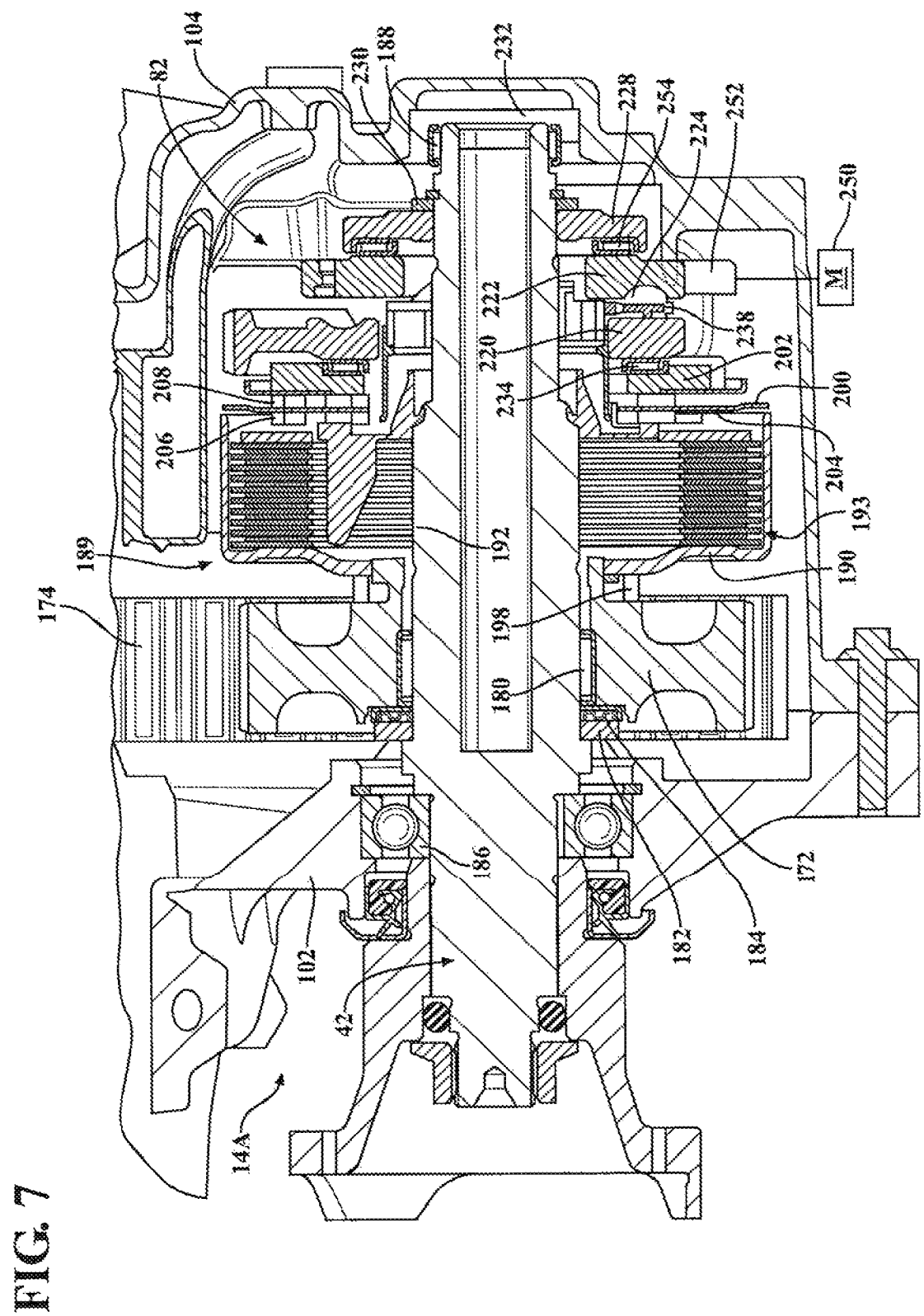
FIG. 7 is an enlarged partial sectional view showing various components of the multi-plate clutch assembly and the clutch actuation mechanism associated with the transfer cases shown in FIGS. 3 through 6.

Mode mechanism 80 is best shown, in the non-limiting example of FIGS. 3 and 7, to include a wet-type multi-plate clutch assembly 189 disposed between second sprocket 172 and front output shaft 42 for facilitating adaptive torque transfer therebetween. Clutch assembly 189 generally includes a first clutch member or clutch drum 190 fixed for common rotation with second sprocket 172, a second clutch member or clutch hub 192 mounted to, formed integrally with, an intermediate section of front output shaft 42, and a multi-plate clutch pack 193 comprised of alternatively interleaved outer clutch plates 194 and inner clutch plates 196. Outer clutch plates 194 are splined for rotation with clutch drum 190 while inner clutch plates 196 are splined for rotation with clutch hub 192. Clutch drum 190 is a formed component and includes a plurality of oil transfer holes (not shown) configured to permit lubricant to flow therethrough. A spacer ring 198 is provided between drum 190 and second sprocket 172.

Clutch assembly 189 also includes a spring retainer ring 200 fixed (via splines, lugs, etc.) for common rotation with clutch drum 190, an axially-moveable apply plate 202 that is connected for common rotation with spring retainer ring 200, and a plurality of circumferentially aligned return springs 204 disposed between spring retainer ring 200 and apply plate 202. As will be detailed, return springs 204 are configured and arranged to normally bias apply plate 202 in a direction toward a retracted position relative to clutch pack 193. Apply plate 202 includes a plurality of axially-extending and circumferentially-aligned drive lugs 206 which extend through window apertures 208 formed in spring retainer ring 200. Drive lugs 206 are configured to engage and apply a compressive clutch engagement force on clutch pack 193, the magnitude of which controls the amount of drive torque that is transferred from clutch drum 190 to clutch hub 192 through clutch pack 193.

Mode actuation mechanism 82 is best shown, in the non-limiting example of FIGS. 3 and 7, to include a clutch actuation mechanism configured as a rotary-to-linear conversion device of the type commonly referred to as a ballramp unit. The ballramp unit generally includes a first cam ring 220, a second cam ring 222, and followers 224 disposed in aligned cam tracks formed therebetween. First cam ring 220 is non-rotatably fixed to housing assembly 70 via an anti-rotation tab 226. First cam ring 220 is also fixed axially and is located against a backing plate 228 via a shim ring 230 and a snap ring 232. Backing plate 228 is splined for rotation with front output shaft 42 such that a radial thrust bearing unit 234 is disposed between first cam ring 220 and backing plate 228. First cam ring 220 has a plurality of circumferentially-aligned first cam tracks 236 which followers 224 engage. Second cam ring 222 includes a matching plurality of second cam tracks 240 against which followers 224 also rollingly engage. A pair of cage plates 238 retain and align followers 224 relative to first cam tracks 236 and second cam tracks 240. Second cam ring 222 is adapted to move axially relative to first cam ring 220 as a result of rotation of second cam ring 222 relative to first cam ring 220. As such, the profile and/or contour of cam tracks 236 and 240 controls the linear motion of second cam ring 222. An electric motor 250 acts as power-operated mode actuator 62B and has a rotary output driving a gear (not shown) that is meshed with geared rack segment 252 of second cam ring 222. As will be understood, the direction and amount of rotation of the electric motor's output controls the direction and amount of rotation of second cam ring 222 which, in turn, controls the direction and amount of axial travel of second cam ring 222 relative to the clutch pack. A thrust bearing assembly 254 is disposed between a face surface of second cam ring 222 and a face surface of apply plate 202 to accommodate rotation of apply plate 202 relative to second cam ring 222 during coordinated axial movement of apply plate 202 with second cam ring 222. Those skilled in the art will appreciate that an alternative ballramp unit having one or both cam rings rotatable to establish axial movement of one of the cam rings is within the scope of the ballramp unit disclosed herein. Additionally, other rotary-to-linear conversion devices (i.e., ballscrew units), camming devices or pivotable devices configured to control the magnitude of the clutch engagement force applied to clutch pack 193 are considered alternatives for mode shift mechanism 82.

Second cam ring 222 is configured to control axial movement of apply plate 202 between a first or minimum clutch engagement position and a second or maximum clutch engagement position relative to clutch pack 193 of clutch assembly 189. With apply plate 202 axially located in its first position, a predetermined minimum clutch engagement force is exerted by drive lugs 206 on clutch pack 193, thereby transferring a minimum amount of drive torque from rear output shaft 28 (through transfer mechanism 78) to front output shaft 42. Typically, no drive torque is transmitted from rear output shaft 28 and transfer mechanism 74 through clutch assembly 189 when apply plate 202 is located in its first position, thereby establishing a "released" mode for clutch assembly 189 and establishing a two-wheel drive (2WD) mode for active transfer case 14A. In contrast, with apply plate 202 axially located in its second position, a predetermined maximum clutch engagement force is exerted by drive lugs 206 on clutch pack 193, thereby transferring a maximum amount of drive torque through clutch assembly 189 to front output shaft 42. In this position, a "fully engaged" mode is established for clutch assembly 189 and a locked four-wheel drive mode (LOCK-4WD) is established for active transfer case 14A. Precise control over the axial location of apply plate 202 between its first and second positions permits adaptive torque transfer from rear output shaft 28 to front output shaft 42 so as to establish an on-demand four-wheel drive (AUTO-4WD) mode for active transfer case 14A. Return springs 204 react between spring retainer ring 200 and apply plate 202 so as to normally bias apply plate 202 toward its first position. Those skilled in the art will recognize that mode actuation mechanism 82 can be any suitable arrangement operable for controlling movement of apply plate 202 relative to clutch pack 193. While not shown, a power-actuated actuator brake is associated with electric motor 250 and functions in a power-off mode to mechanically hold a component of motor (i.e. the motor shaft), thereby holding apply plate 202 to establish the LOCK-4WD mode and allowing electric motor 250 to be turned off when one of the LOCK-4WD modes is selected.

First lubrication mechanism 84 is shown, in this non-limiting example, to include a lube pump 270 having a pump housing 272 non-rotatably fixed to housing assembly 70, and a pump assembly 274 disposed in a pump chamber formed within housing 272. Pump assembly 274 has a rotary pump member fixed for rotation with rear output shaft 28 and which is operable for drawing lubricant from sump area 90 (through a supply tube 276) into a suction-side inlet portion of the pump chamber formed in pump housing 272. Rotation of the rotary pump member caused by rotation of rear output shaft 28 causes the lubricant to be pressurized and discharged from a pressure-side discharge portion of the pump chamber for delivery to a central lube channel 278 formed in rear output shaft 28 via one or more radial feed ports 280. Thereafter, the lubricant in control lube channel 278 is radially dispersed via radial discharge ports to provide lubricant to the various rotary components aligned with the "A" axis. In one embodiment, lube pump 270 could be a gerotor pump.

Second lubrication mechanism 86 is shown, in this non-limiting embodiment, to be configured to catch lubricant splashed from clutch drum 190, second sprocket 172 and chain 174 and to transfer the captured lubricant for use in lubricating and cooling components associated with mode mechanism 80 and other rotary components aligned with the "B" axis. In general, second lubrication mechanism 86 is a "splash recovery" lubrication system that is operable for use in power transfer units having a multi-plate clutch assembly disposed, at least partially, for rotation in a lubricant sump, such as sump area 90. The splash recovery clutch lubrication system associated with the various active transfer cases disclosed herein is applicable to other power transfer units of the type used in vehicular drivetrain applications to provide a "pumpless" solution to lubricating rotary components aligned for rotation along a rotary axis positioned in proximity to a lubrication sump. The splash recovery clutch lubrication system provides a means for supplying lubricant to a control portion of a rotating clutch located in the lubricant sump. The present disclosure also eliminates pump priming concerns at low RPM since as the rotational speed increases, the lubricant splashes and reduces the sump height. However, the recovery system feeds lubricant back into the clutch system without concerns related to conventional pump priming. Other resulting advantages include minimized spin losses, weight savings, improved packaging and noise reduction over conventional pump systems. While not limited thereto, one example of a splash-type lubrication mechanism 82 is shown and disclosed in commonly-owned U.S. application Ser. No. 14/718,798 filed May 21, 2015, the entire disclosure of which is incorporated herein by reference.

Figure 4:
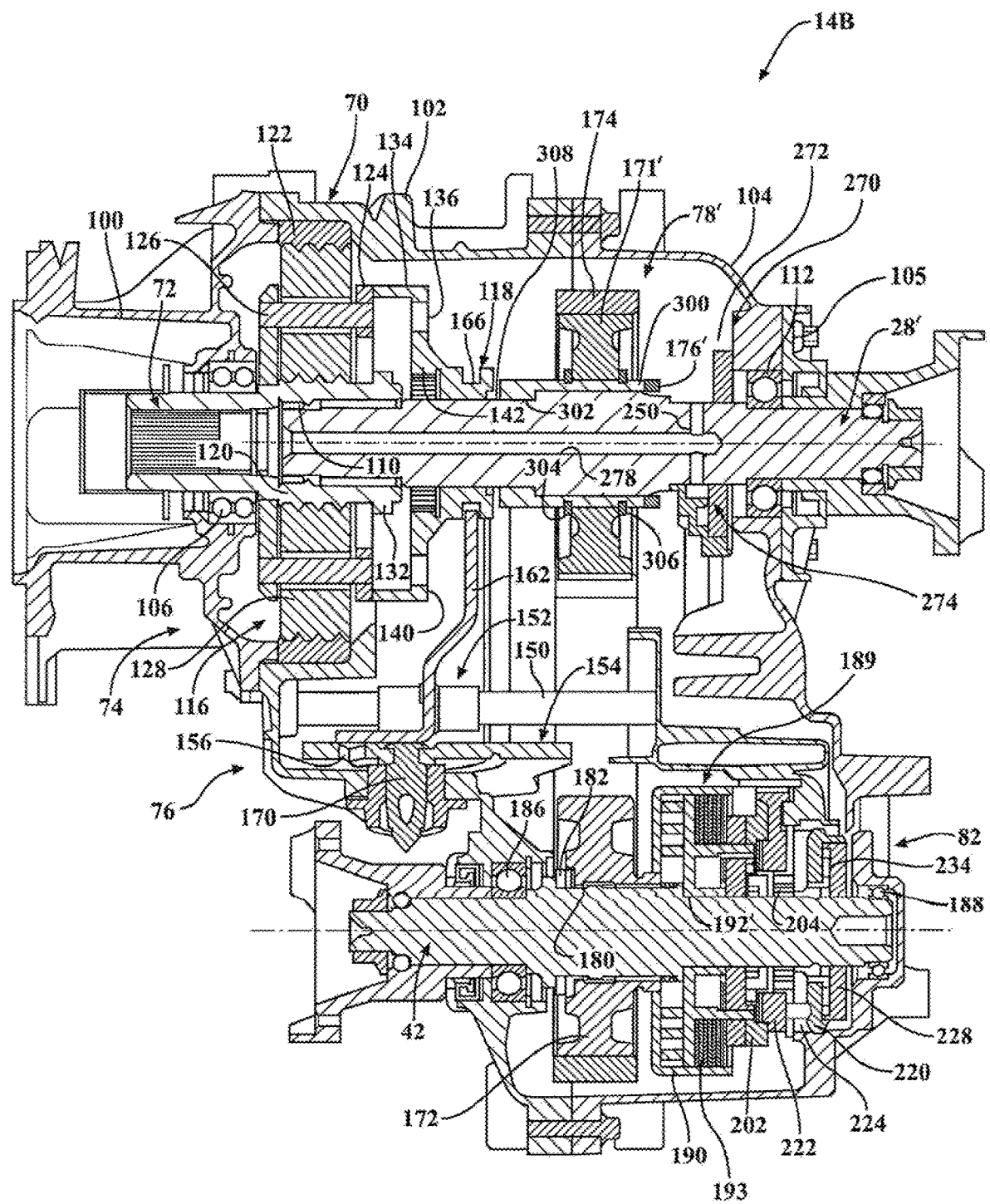
FIG. 4 is a sectional view of a two-speed active transfer case constructed in accordance with a second embodiment of the present disclosure.

Referring now to FIG. 4, an alternative embodiment of active transfer case 14 is identified by reference numeral 14B. Active transfer case 14B is substantially similar in construction and function to active transfer case 14A of FIG. 3, with the exception that first sprocket 171' is now drivingly coupled (i.e., splined) to a drive hub 300 which, in turn, is coupled via a splined connection 302 to rear output shaft 28'. A pair of retainer rings 304, 306 axially restrain and locate first sprocket 171' on drive hub 300. Drive hub 300 is retained and axially positioned against a radial shoulder 176' of rear output shaft 28' via a snap ring 308. In addition, clutch hub 192' is now a separate clutch component splined to front output shaft 42. Due to the similarity of the remaining components of active transfer case 14B to the previously described components associated with active transfer case 14A, common reference numerals are used to identify similar components and further description is not otherwise required. Suffice it to say that active transfer case 14B is capable of establishing all of the drive modes described in relations to active transfer case 14A.

Figure 5:
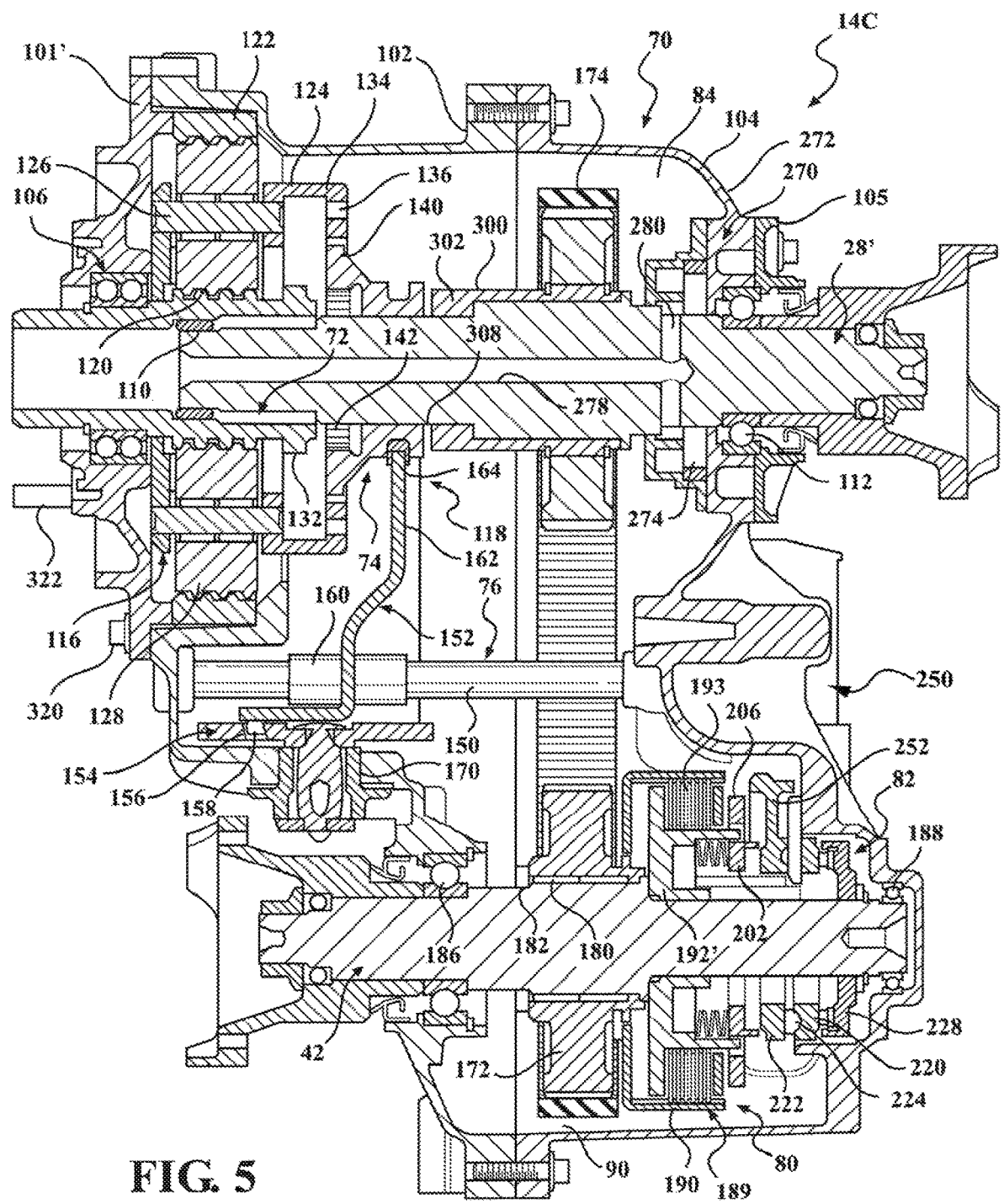
FIG. 5 is a sectional view of a two-speed active transfer case constructed in accordance with a third embodiment of the present disclosure.

Referring to FIG. 5, another alternative embodiment of active transfer case 14 is identified by reference numeral 14C. Active transfer case 14C is substantially similar in construction and functional operation to active transfer case 14B of FIG. 4 with the exception that a modified adapter housing section 101' is now associated with multi-piece housing 70. Adapter 101' is secured to housing section 102 via bolts 320 and includes a plurality of mounting studs 322 arranged for retention in alignment apertures formed in the transmission housing. Input shaft 72 extends outwardly from adapter housing 101'. The various arrangements shown in FIGS. 3 through 5 are provided to illustrate the modularity associated with the present disclosure.

Figure 6:
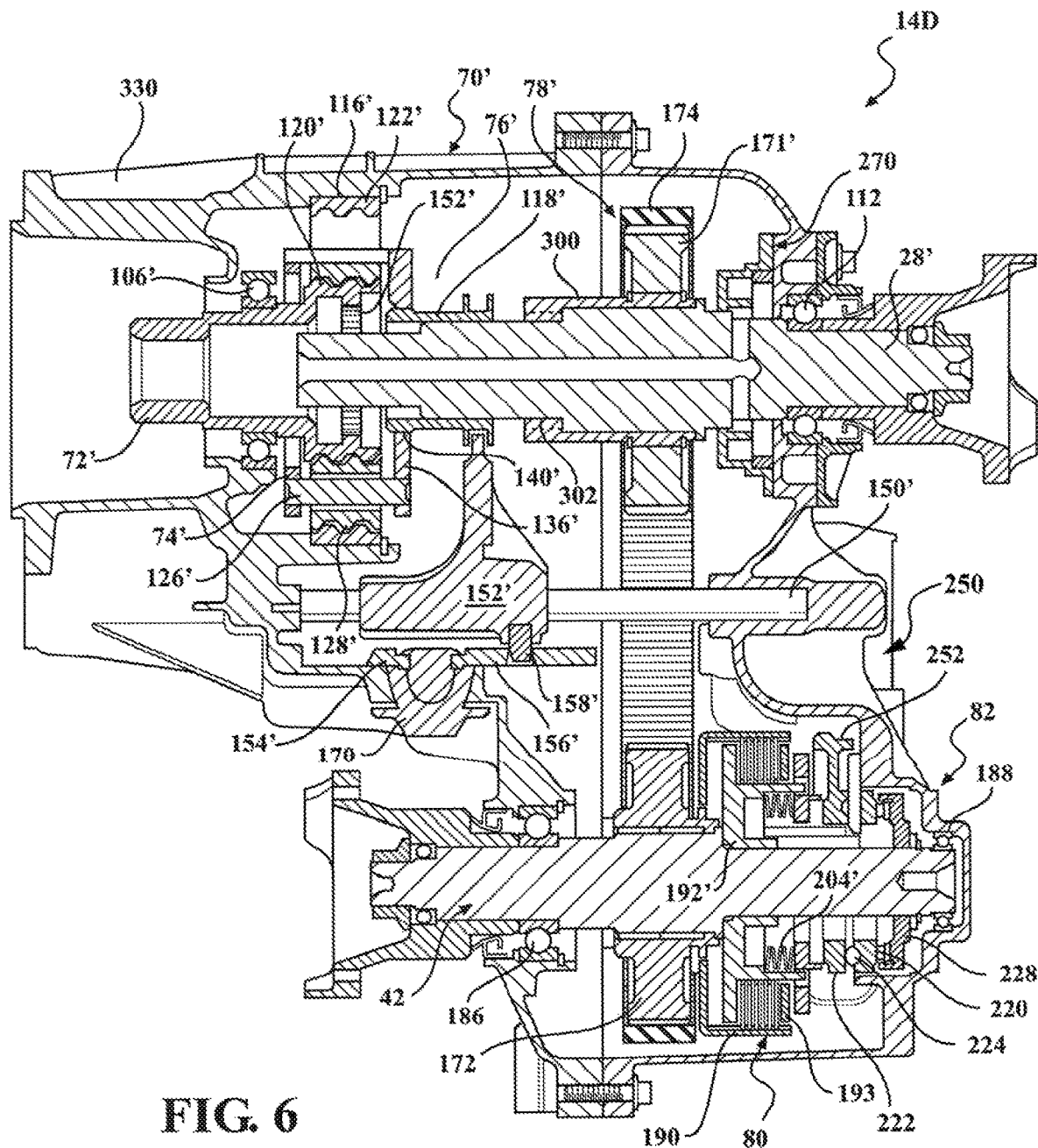
FIG. 6 is a sectional view of a two-speed active transfer case constructed in accordance with a fourth embodiment of the present disclosure.

Referring to FIG. 6, yet another alternative embodiment of active transfer case 14 is identified by reference numeral 14D. Active transfer case 14D is generally similar to active transfer cases 14A-14C in structure and functional operation but is now configured to include a slightly modified range actuation mechanism 76' and range mechanism 74' in combination with a modified housing assembly 70'. Housing assembly 70' is now shown with adapter section 100 and first housing section 102 of transfer case 14A integrated into a common housing section 330. In addition, input shaft 72' is now shown with sun gear 120' formed on a radially enlarged hub section and which defines internal sun gear clutch teeth 132'. External clutch teeth 140' on range collar 118' are now configured to engage carrier clutch teeth 136' when range collar 118' is located in its L range position to engage sun gear clutch teeth 132' when range collar 118' is located in its H range position. In addition, range shift mechanism 76' now includes a range fork 152' slideably mounted on shift rail 150' with its range pin 158' retained in a range slot 165' formed in sector plate 154'. Mode mechanism 80 and power-operated mode actuator 82 are similar to the arrangements previously disclosed.

Figure 8:
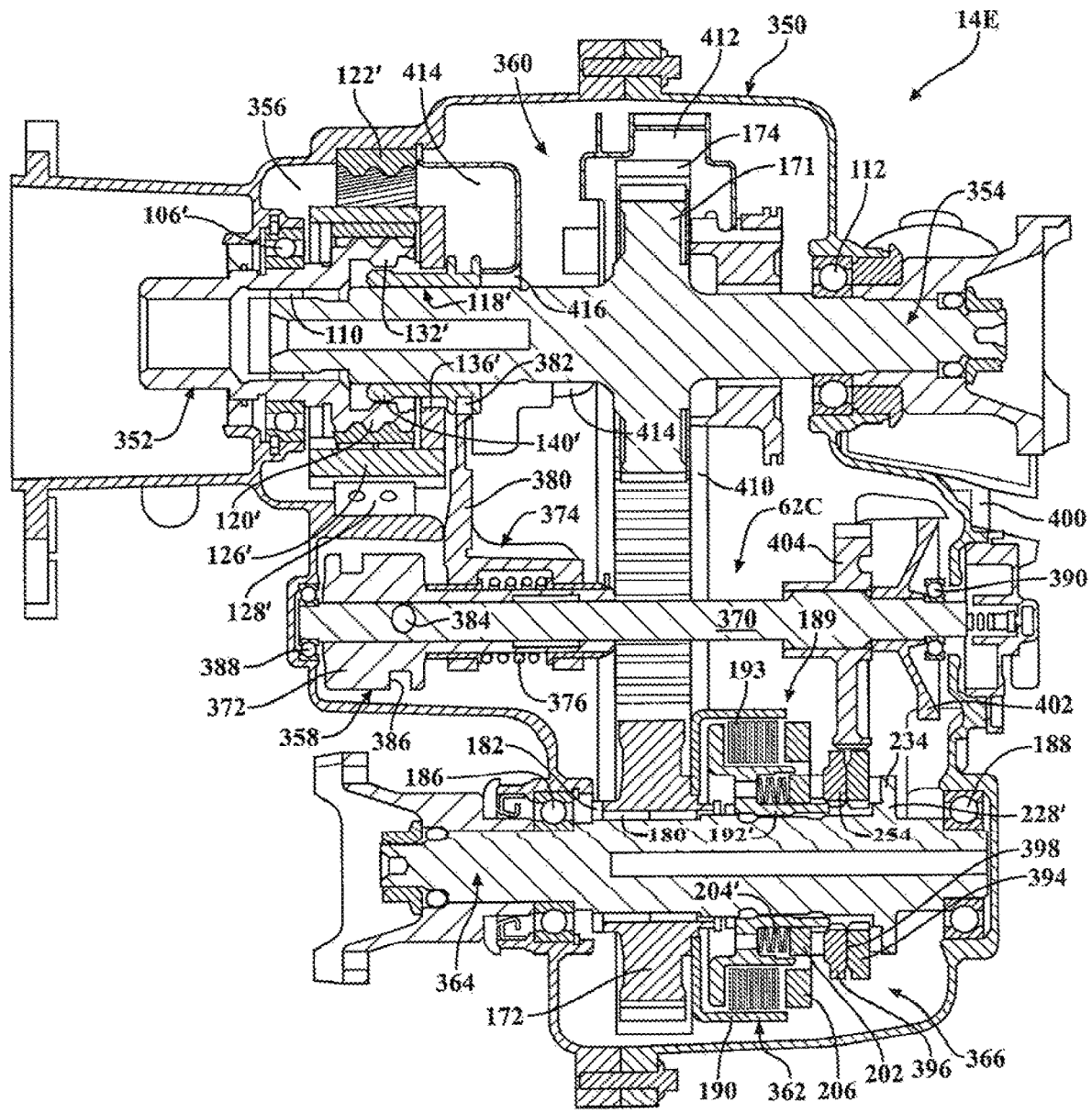
FIG. 8 is a sectional view of a two-speed active transfer case constructed in accordance with a fourth embodiment of the present disclosure.

Referring now to FIG. 8, another alternative embodiment of active transfer case 14 is identified by reference numeral 14E. Active transfer case 14E differs from the previously disclosed alternative embodiments of active transfer case 14 in that it is equipped with an integrated range and mode actuation mechanism and a power-operated shift actuator 62C. Active transfer case 14E is generally shown to include: a housing assembly 350; an input shaft 352 rotatably supported by housing assembly; a rear output shaft 354 rotatably supported by input shaft 352 and housing assembly 350; a two-speed range mechanism 356 disposed between input shaft 352 and rear output shaft 354; a range actuation mechanism 358 controlling operation of two-speed range mechanism 356; a transfer mechanism 360 driven by rear output shaft 354; a mode mechanism 362 disposed between transfer mechanism 360 and a front output shaft 364; a mode actuation mechanism 366 controlling operation of mode mechanism 362; and a splash lubrication system 368, all in addition to power-operated shift actuator 62C. As before, range mechanism 356 is arranged in association with a first rotary axis "A" that is shared with input shaft 352 and rear output shaft 354 while mode mechanism 362 and front output shaft share a second rotary axis "B".

Two-speed range mechanism 356 is generally similar to two-speed range mechanism 74' of FIG. 6 and includes planetary gearset 116' and range clutch 118'. Range clutch 118' is a sliding range collar moveable between the H, N, L range positions relative to planetary gearset 116'. Operation of range actuation mechanism 358 and mode actuation mechanism 366 is controlled and coordinated by power-operated shift actuator 62C. Range actuation mechanism 358 generally includes a rotary shift shaft 370, a range cam 372 supported for axial movement on shift rail 370, and a range fork unit 374 mounted via a spring-loaded mechanism 376 on a tube segment 378 of range cam 372. Range fork unit 374 has a fork section 380 engaging a groove 382 formed in range collar 118'. A range pin 384 is fixed for rotation with shift shaft 370 and extends into a contoured range shift groove 386 formed in range cam 372. Shift shaft 370 is shown rotatably supported in housing assembly 350 via a pair of laterally spaced bearings 388, 390. Spring-loaded mechanism 376 is provided to permit axial movement of range cam 372 when a "tooth block" condition exists between range collar 118' and the clutching components of planetary gearset 356 to the desired range position following release of the tooth block condition.

Transfer mechanism 360 is generally similar to transfer mechanism 78 of FIG. 3 and includes first sprocket 171 formed on rear output shaft 354, a second sprocket 172 rotatably supported on front output shaft 364, and an endless power chain 174 encircled therebetween. Mode mechanism 362 is also generally similar to mode mechanism 80 shown in FIGS. 4-6 and includes multi-plate clutch assembly 189 with the components thereof identified by common reference numbers. Mode actuation mechanism 366 is a slightly modified version of the ballramp type clutch actuation mechanism and has a first cam plate 394, second cam plate 396, and roller 398 retained in cam tracks formed in the first and second cam plates. First cam plate 394 is supported against a backing ring 228' extending integrally from front output shaft 364 via a bearing assembly 234. Another bearing assembly 254 is positioned between second cam plate 396 and apply plate 202.

In accordance with the construction shown in FIG. 8, power-operated shift actuator 62C includes an electric motor 400 having a rotary output configured to drive a reduction gear 402 fixed (i.e., splined) for rotation with shift shaft 370. A mode cam 404, associated with mode actuation mechanism 366, is fixed for rotation with shift shaft 370. Mode cam 404 includes a first cam surface against which a first follower segment of first cam plate 394 rests, and a second cam surface against which a second follower segment of second cam plate 396 rests. The configuration of the first and second cam surfaces are selected to cause at least one of first cam plate 394 and second cam plate 396 to rotate relative to the other which, in turn, results in axial movement of second cam plate 396. This axial movement results in corresponding axial movement of apply plate 202 relative to clutch pack 193, thereby providing adaptive torque transfer between second sprocket 172 and front output shaft 364. Accordingly, the configuration of range groove 386 in range cam 372 and the configuration of the mode cam tracks on mode cam 404 are selective to facilitate coordinated movement of range fork unit 374 and apply plate 202 to establish each of the available drive modes.

Splash lubrication system 368 is shown in FIG. 8 to be configured as a "pumpless" arrangement operable to circulate lubricant splashed during rotation of second sprocket 172 and chain to lubricate components aligned on the rotary axis of front output shaft 364 as well as the rotary axis of rear output shaft 354. Lubrication system 368 is shown to include a guide housing 410 generally enclosing a portion of power chain 174 and first sprocket 171. Guide housing 410 defines a lubricant reservoir segment 412 configured to collect the lubricant. A tube 414 fluidically connects reservoir segment 412 to a lube chamber 414 formed with a bell-shaped lube housing 416 configured to enclose and separate planetary range mechanism 356. This arrangement is configured to direct lubricant to rotary components on mainshaft 352/354.

As mentioned, each of the active transfer cases described previously is equipped with a power-operated clutch actuator used to control actuation of a clutch actuation mechanism for controlling the magnitude of the compressive clutch engagement force exerted on the clutch pack of the multi-plate clutch assembly. Such adaptive regulation of the clutch engagement force results in adaptive regulation of the amount of drive torque transferred from the powertrain to each of the front and rear drivelines of the 4WD vehicle. In this regard, a control system was also disclosed for controlling such drive torque distribution in response to detection of certain conditions (i.e. road, weather, etc.) by the vehicle sensors. The ECU associated with the control system can be remote from, or directly associated with the power-operated clutch actuator. This ECU includes software controlling transfer case functionality as it pertains to vehicle performance, other vehicle systems and diagnostics. Specifically, the ECU has diagnostic circuits employed to detect operational functionality of certain devices, such as the actuator brake, to indicate potential malfunction situations.

As is known, the actuator brake functions to mechanically hold a component of the power-operated clutch actuator, typically the electric motor output shaft, thereby mechanically holding the clutch actuation mechanism (i.e. the ballramp unit) which in turn holds the apply plate in an engaged position relative to the clutch pack. Typically, the actuator brake is a power-off spring-loaded device operable in an engaged state to mechanically engage and hold the motor shaft. Energization of the actuator brake (i.e. power-on) functions to shift it into a released state disengaged from the motor shaft, thereby allowing operation of the power-operated clutch actuator to adaptively control the on-demand transfer of drive torque through the clutch assembly.

Figure 9:
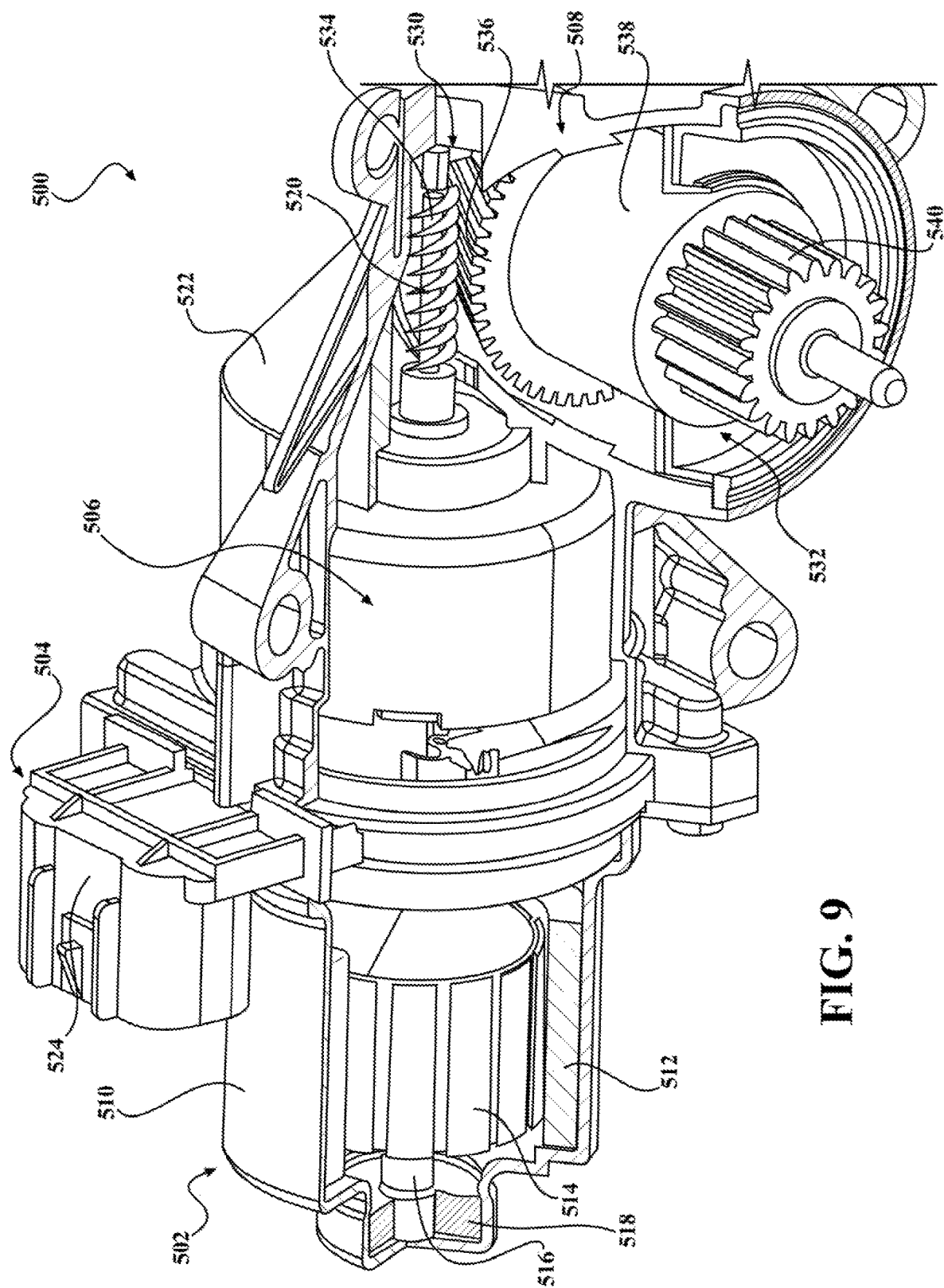
FIG. 9 is a partially-sectioned isometric view of a power-operated clutch actuator equipped with an actuator brake and which is capable of being installed on any of the active transfer cases to control operation of the clutch actuation mechanism.

Referring to FIG. 9, a partially-sectioned isometric view of a non-limiting embodiment of a power-operated mode or clutch actuator 500 of the type adapted for use with any of the active transfer cases previously disclosed. Clutch actuator 500 generally includes an electric motor 502, a brush card assembly 504, an actuator brake 506, and a reduction gearset 508. Electric motor 502 is shown, in this non-limiting embodiment, to generally include a motor housing 510, a stator 512 fixed within housing 510, and a rotary armature assembly having windings 514 and an armature shaft 516. Armature shaft 516 has a first end rotatably supported in a bearing assembly 518 and a second end configured as, or fixed for rotation with, a worm shaft 520. An intermediate segment of armature shaft 516 extends through brush card assembly 504 and actuator brake 506. As seen, actuator brake 506 and reduction gearset 508 are both installed within a gear housing 522. Brush card assembly 504 is shown disposed between motor housing 510 and gear housing 522 and provides seal faces therebetween. Brush card assembly 504 provides an electrical connector 524 configured to receive electric control signals from ECU 56 for controlling energization of electric motor 502 and actuator brake 506. Brush card assembly 504 is also configured to locate and retain electrical terminals, a printed circuit board (PCB), and one or more actuator sensors. One such sensor includes a position sensor operable to detect a rotated position of armature shaft 516.

With continued reference to FIG. 9, reduction gearset 508 is shown to generally include a right-angle worm gear assembly 530 and a drive gear assembly 532. Worm gear assembly 530 includes a worm thread 534 formed on worm shaft 520 and a worm gear 536 meshed with worm thread 534. Likewise, drive gear assembly 532 includes a stub shaft 538 fixed for rotation with worm gear 536 and an output pinion 540 fixed for rotation with stub shaft 538. Output pinion 540 is in constant meshed engagement with geared rack segment 252 of second cam ring 222 associated with the ballramp unit. As previously noted, the direction and amount of rotation of armature shaft 516 in response to energization of electric motor 502 controls the direction and amount of rotation and axial movement of second cam ring 222 which, in turn, controls the movement of apply plate 202 relative to clutch pack 193 of clutch assembly 189.

Figure 10:
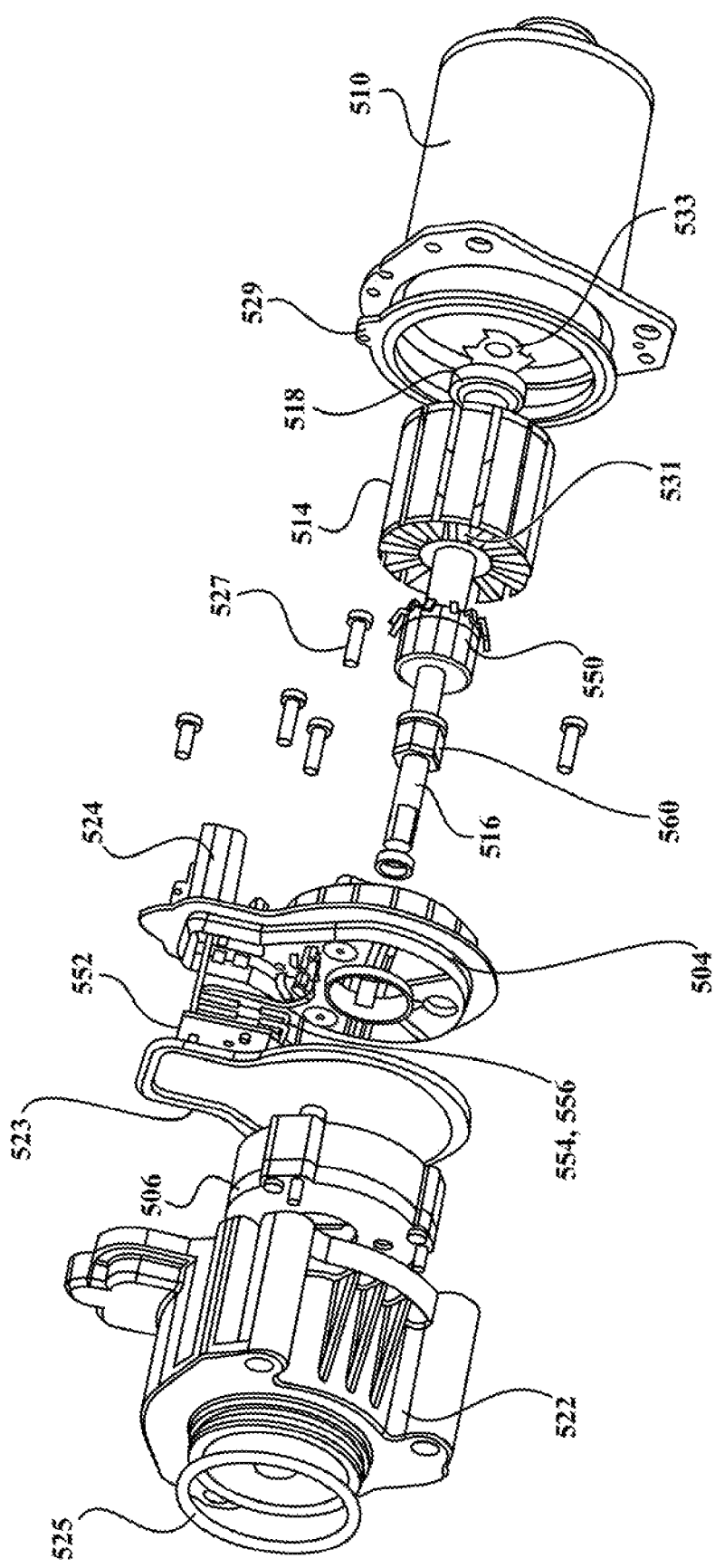
FIG. 10 is an exploded view of the power-operated clutch actuator illustrating a non-limiting embodiment of the electric motor and its interaction with the actuator brake.

FIG. 10 is an exploded view of power-operated clutch actuator 500 to better illustrate various components associated with actuator brake 506 and electric motor 502. A commutator 550 is shown fixed to armature shaft 516 for rotation within brush card assembly 504. Brush card assembly 504 includes PCB 552 as well as power actuator terminals 554 for electric motor 502 and power brake terminals 556 for actuator brake 506. A brake coupling sleeve 560 is fixed for rotation with armature shaft 516 and is configured to drive a drive plate 562 (FIG. 11A) associated with actuator brake 506. A housing seal 523 is located between brush card assembly 504 and the gear housing 522. An O-ring 525 is located on the gear housing 522, opposite the brush card assembly 504. A plurality of bolts 527 connect the motor can 510 to the gear housing 522 and a motor can seal 529 seals the connection therebetween. Insulators 531 are shown located between windings 514 and the armature shaft 516. A plating spring 533 may be located towards a terminal end of the armature shaft 516.

Figure 11B:
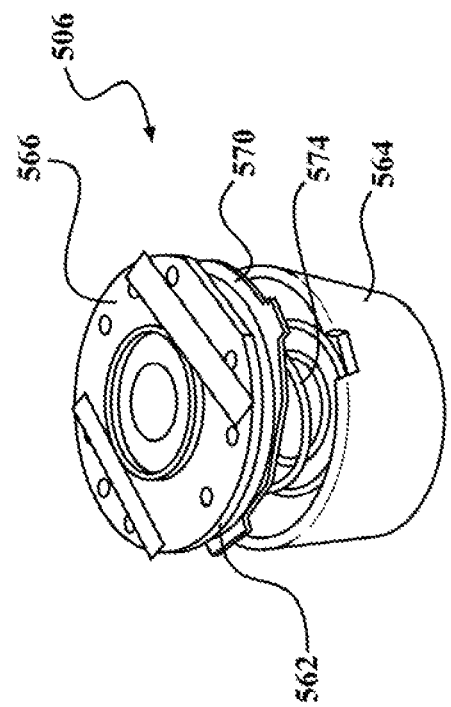
FIGS. 11A and 11B are views illustrating a non-limiting construction for the actuator brake.
Figure 11A:
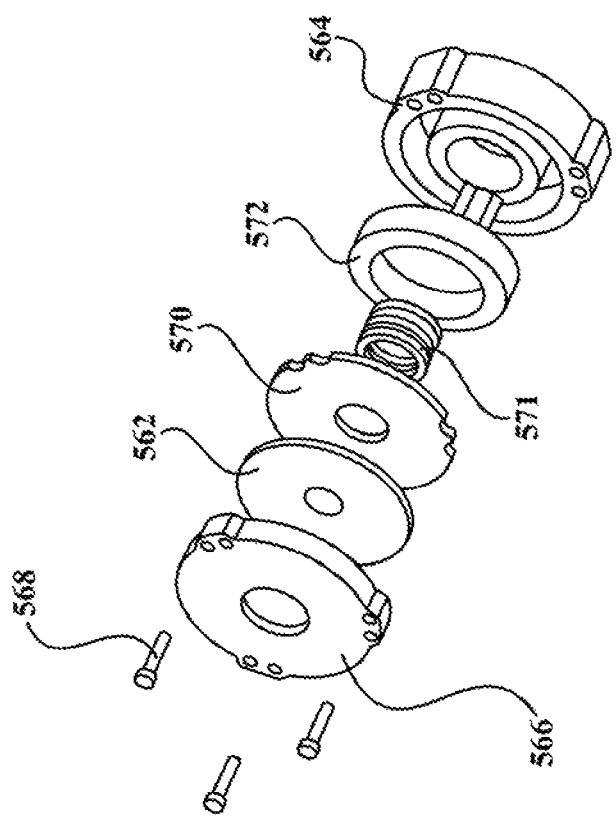

FIGS. 11A and 11B better illustrate the components associated with actuator brake 506 and which generally includes a brake house 564, a brake cap 566 configured to be secured to brake housing 564 via screws 568, a magnetic brake disc 570, an electromagnetic coil 572, and a brake spring 574. All of these components have a central aperture sized to permit armature shaft 516 to pass therethrough. Drive plate 562 of actuator brake 506 is coupled via coupling sleeve 560 for common rotation with armature shaft 516. In operation, when coil 572 is not energized (i.e. power-off condition), brake spring 574 functions to forcibly bias brake disc 570 into engagement with drive plate 562, thereby placing actuator brake 506 in a power-off engaged state of operation, whereby armature shaft 516 is braked against rotation. In contrast, when coil 572 is energized (i.e. power-on condition), the magnetic force generated functions to retract brake disc 570 out of engagement with drive plate 562, thereby placing actuator brake 506 in a power-on disengaged state of operation. The magnetic attraction is able to overcome the normal biasing of brake spring 574 when coil 572 is energized.

The control logic associated with ECU 56 is configured to provide diagnostic check of the functionality of actuator brake 506. If an electrical or mechanical malfunction of actuator brake 506 occurs, it is desirable to detect such a malfunction prior to a time when brake functionality is required. Therefore, the present disclosure is directed to providing a preemptive or "active" check of actuator brake functionality which enables the control logic to take action and/or notify the vehicle operator of a compromised 4WD functionality before the vehicle is placed in a potentially unsafe operational situation. As noted in the Background, conventional passive brake circuit diagnostics typically function to detect a chance in voltage in the brake circuit which generally is indicative of a total loss of brake control. As noted, current passive software-based brake diagnostics function to A) monitor movement of the armature shaft when the actuator brake is engaged and the clutch actuator is not energized; and B) monitor no rotation of the armature shaft when the actuator brake is disengaged and the clutch actuator is energized. Thus, such passive diagnostics can only identify when brake functionality has already been compromised. Accordingly, the addition of the active brake functionality check in combination with these passive diagnostic checks provides significantly improved detection coverage of possible malfunctions.

As noted, such an active brake functionality check would enable the control logic or software to take action and/or notify the vehicle operator of compromised functionality of the actuator brake. For example, if the vehicle is parked on an inclined surface, such as a hill, engagement of the clutch assembly (i.e. 4WD) may be required to maintain the vehicle's position. If the actuator brake is stuck open, 4WD engagement may not be possible and the vehicle may be at risk of rolling out of its parked position. However, if the active brake check is utilized, a notification would alert the vehicle operator before leaving the vehicle, thereby permitting the vehicle to be moved and parked on a level surface. Similarly, if the vehicle approaches the hill while the transfer case is operating in 2WD mode, the vehicle operator may be instructed to engage the 4WD mode during parking. In this situation, if the actuator brake is stuck engaged, 4WD engagement of the clutch assembly may not be possible, whereby the vehicle is again potentially susceptible to rolling away. Finally, if the control logic detects operation of the vehicle in an off-road scenario in which 4WD mode is required, detection by the active brake functionality check of one or more recent instances of potential actuator brake malfunction, the control logic could alert the vehicle operator and recommend against shifting out of 4WD or deny such a shift request altogether. Not being able to subsequently shift back into the 4WD mode (because the actuator brake is stuck closed) could potentially result in the vehicle becoming stuck on the off-road trail.

Another advantage of the present disclosure relates to pairing the active brake functionality check with the existing passive diagnostics. For example, if the passive check identifies armature shaft movement while the actuator brake is engaged, the active check could be used to determine whether the armature shaft movement is due to a mechanical malfunction or another root cause such as malfunction of an electrical position sensor.

The following description will start with the known passive brake diagnostic checks and then build thereon with the active brake functionality check of the present disclosure. An algorithm can be implemented in the software which monitors the position of a moveable component such as, for example, armature shaft 516. Specifically, upon completion of the desired movement of armature shaft 516, the software captures the desired achieved position value (P1) of armature shaft 516 using the position sensor. Once the desired position is achieved, the software requests actuator brake 506 to shift from its disengaged (power-on) state to its engaged (power-off) state. Since every mechanical device has inherent lag, the software waits an additional predetermined lag time with an additional safety factor before engagement of actuator brake 506. This lag time permits actuator brake 506 to engage and mechanically hold armature shaft 516 in position. Thereafter, electrical power is turned off to electric motor 502 and actuator brake 506 allowing actuator brake 506 to engage and hold armature shaft 516. At this point, the software captures the actual position value (P2). The software then calculates a first difference value P1-P2 between the desired and actual positions. If actuator brake 506 is engaged properly, the first difference value P1-P2 should equal zero. If the software observes that the first difference value is greater than a predetermined threshold value, then the software considers that as detection of a faulted actuator brake and takes failsafe action. This passive diagnostic check can be performed at regular intervals.

There are two shortcomings to this diagnostic check. First, this passive check relies on the system reaction to move without software interaction. This is problematic in low efficiency and/or low back-reaction systems. Secondly, the passive checks only monitor the position of armature shaft 516 when the software is ON. After the software is turned OFF, no failsafe action can be taken. To solve these shortcomings, an additional check in the form of the "active" brake check is performed. In short, the active brake check functions to preemptively check the functionality of actuator brake 506.

In accordance with a preferred, but non-limiting arrangement, the active brake check is as follows. After ECU 56 requests actuator brake 506 to function in its power-off engaged state an armature shaft 516 is held in its actual position, the software initiates a preemptive request to attempt to move armature shaft 516 by energizing electric motor 502. This request will result in a force being exerted on the system response to the an attempt to rotate armature shaft 516 despite being braked by actuator brake 506. If actuator brake 506 is functioning properly, it will be able to hold the position and prevent rotation of armature shaft 516. If there is any malfunction in actuator brake 506, the software will observe a change in position and immediately take failsafe action. Specifically, P1 value is the position captured by the software after achieving the desired position of armature shaft 516. In addition, the software captures a P3 position value indicative of the position of armature shaft 516 after the preemptive request to move armature shaft 516. Similar to calculating the P1-P2 difference, the software now calculates the P1-P3 difference value. If the absolute value of this P1-P3 difference value is greater than the predetermined threshold, then the software considers the active brake check to have failed and performs failsafe action.

To increase the reliability of the active brake check, a fail counter can be implemented. Thus, instead of considering actuator brake 506 failed after detection of a single failed active check, the software can implement the fail counter which counts the number of consecutive failed active brake checks. Once the fail count reaches a predetermined count threshold, the software will then perform failsafe action. As an option to requesting a constant electrical current as part of the active brake check, the software can gradually increase the preemptive request from zero to a predetermined request level. This gradual increase in the current during the preemptive request avoids scenarios where a constant current preemptive request can lead to a sudden change in the position of armature shaft 516.

To increase the robustness of the active brake check, the P3 position value can be monitored continuously during the preemptive request. By doing this, a malfunction in actuator brake 506 can be detected sooner and with less current requested. The force exerted on armature shaft 516 during the active brake check when the actuator brake 506 is engaged should be less than the spring-loaded force required to hold brake disc 562. In addition, the direction associated with the active check should be directed away from an unsafe position. This active check can be performed multiple times in the kay ignition cycle. The active check affects the duty cycle of clutch actuator 500, so actuator durability and service life should be considered before deciding on the number of times the active check is performed per each key-ignition cycle. To improve controllability, duty cycle of clutch actuator 500 can be requested or current or pressure.

Figure 12:
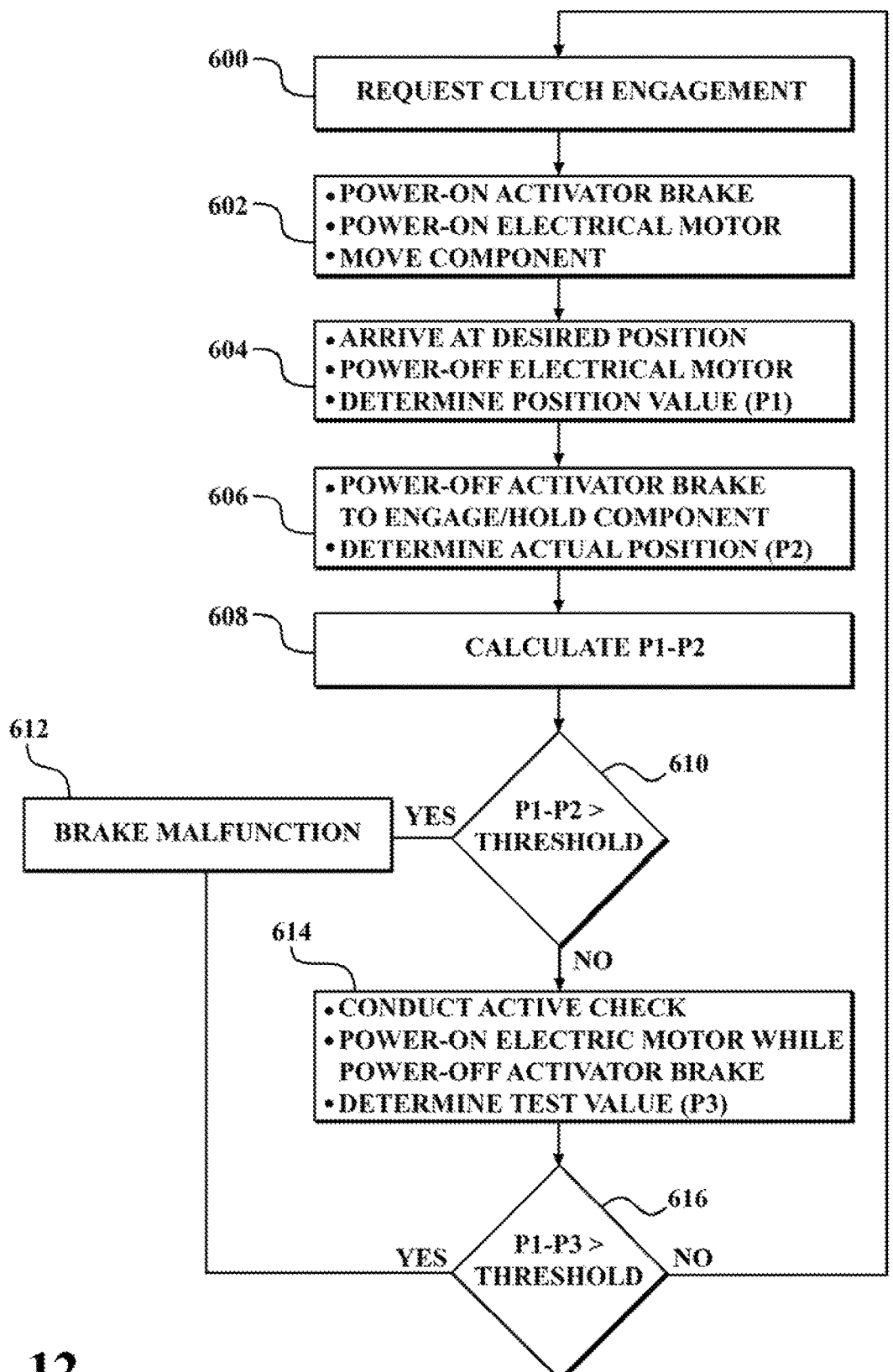
FIG. 12 is a process chart illustrating operation of an "active" preemptive actuator brake functionality check in accordance with the present disclosure.

Referring now to FIG. 12, a flow or process chart is provided to describe the various steps associated with the passive diagnostic check and the active brake check conducted by the control system for actuator brake 506. Specifically, block 600 indicates a request for a clutch engagement of the clutch assembly. In response to this request, block 602 indicates that actuator brake 506 is energized to shift into its released state and electric motor 502 is energized to cause armature shaft 516 to rotate. Once armature shaft 516 has reached a desired position, power to electric motor 502 is turned off and the position sensor detects the desired position value (P1), as indicated by block 604. Block 606 indicates the subsequent de-energization of actuator brake 506 so as to mechanically engage and hold armature shaft 516 in an actual position (P2), as determined by the position sensor. Block 608 indicates calculation of the first difference value (P1—P2). Block 610 indicates the determination of whether the first difference value exceeds the threshold value. If YES, block 612 indicates determination of a malfunction of actuator brake 506 which is used to notify the vehicle operator. If NO, the active brake check is conducted at block 614. Specifically, while actuator brake 506 is maintained in its engaged state, motor 502 is energized in an attempt to rotate armature shaft 516. At this time, a test or check position value (P3) is detected by the position sensor. Block 616 indicates the step of calculating a second difference value (P1—P3). If this second difference value is greater than the threshold value, a brake malfunction is determined (block 612). If the second difference value is less than the threshold value, no malfunction is identified and this process is repeated. If the second difference value exceeds the threshold value, a notification is sent to the vehicle operator.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. An active transfer case configured for use in a 4WD motor vehicle to permit "on-demand" transfer of drive torque from a powertrain to front and rear drivelines comprising:
an input shaft adapted to receive drive torque from the powertrain;
a rear output shaft adapted for connection to the rear driveline and configured to be driven by the input shaft;
a front output shaft adapted for connection to the front driveline;
a transfer mechanism driven by one of the front and rear output shafts;
a multi-plate clutch assembly disposed between the transfer mechanism and the other one of the front and rear output shafts;
a clutch actuation mechanism operable to selectively apply a clutch engagement force to the clutch assembly;
a power-operated clutch actuator operable to actuate the clutch actuation mechanism;
a power-operated actuator brake operable to selectively brake a moveable component associated with one of the clutch actuation mechanism and the clutch actuator; and
a control system operable to control coordinated actuation of both the clutch actuator and the actuator brake, wherein the control system is configured to conduct a preemptive or "active" brake functionality check to determine the functionality of the actuator brake.

2. The active transfer case of claim 1, wherein the power-operated clutch actuator includes an electric motor having a motor shaft operable to drive the clutch actuation mechanism, and wherein the power-operated actuator brake is operable in a power-on released state to permit rotation of the motor shaft and in a power-off engaged state to brake rotation of the motor shaft.

3. The active transfer case of claim 2, wherein the active brake functionality check includes energizing the electric motor while the actuator brake is maintained in its power-off engaged state and detecting whether the motor shaft has rotated from its braked position.

4. The active transfer case of claim 3, wherein rotation of the motor shaft beyond a threshold value during the active brake functionality check indicates a malfunction of the actuator brake.

5. The active transfer case of claim 4, wherein the active brake functionality check can be conducted a plurality of consecutive times prior to indication of the malfunction being established.

6. The active transfer case of claim 2, wherein a method for conducting the active brake functionality check includes the steps of:
requesting clutch assembly engagement;
releasing the actuator brake and energizing the electric motor to drive the motor shaft to a position corresponding to the clutch engagement request;
de-energizing the electric motor and de-energizing the actuator brake so as to shift the actuator brake into its power-off engaged state;
determining a desired braked position (P1) of the motor shaft;
re-energizing the electric motor in attempt to rotate the motor shaft while actuator brake is engaged;
determining a check position (P3) of the motor shaft;
calculating a difference value P1—P3;
comparing difference value to threshold value; and
determining a malfunction of the actuator brake if the difference value is greater than the threshold value.

7. The active transfer case of claim 6, wherein the method for conducting the active brake functionality check further includes the steps of:
mechanically holding the motor shaft in an actual position (P2) as determined by a position sensor during the step of de-energizing the electric motor;
calculating a difference value P1—P2;
determining if the difference value between P1 and P2 exceeds a threshold value; and
notifying vehicle operator if difference value P1—P2 exceeds threshold value.

8. The active transfer case of claim 7, wherein the method for conducting the active brake functionality check further includes the steps of:
conducting an active brake check if difference value P1—P2 is below threshold value; and
wherein the active brake check begins with the step of re-energizing the electric motor in attempt to rotate the motor shaft while actuator brake is engaged.

9. The active transfer case of claim 6, wherein the method for conducting the active brake functionality check further including the steps of:
notifying vehicle operator if difference value P1—P3 exceeds threshold value.

10. The active transfer case of claim 9, wherein the method for conducting the active brake functionality check further including the steps of:

automatically repeating the brake functionality check if difference value P1 —P3 is below threshold value.

11. An active transfer case configured for use in a 4WD motor vehicle to permit "on-demand" transfer of drive torque from a powertrain to front and rear drivelines comprising:
an input shaft adapted to receive drive torque from the powertrain;
a rear output shaft adapted for connection to the rear driveline and configured to be driven by the input shaft;
a front output shaft adapted for connection to the front driveline;
a transfer mechanism driven by one of the front and rear output shafts;
a clutch assembly disposed between the transfer mechanism and the other one of the front and rear output shafts;
a clutch actuation mechanism operable to selectively apply a clutch engagement force to the clutch assembly;
a power-operated clutch actuator operable to actuate the clutch actuation mechanism;
a power-operated actuator brake operable to selectively brake a moveable component associated with one of the clutch actuation mechanism and the clutch actuator, wherein the power-operated actuator brake is operable in a power-on released state to permit movement of the moveable component and in a power-off engaged state to brake movement of the moveable component; and
a control system configured to conduct an "active" brake functionality check by energizing the power-operated clutch actuator while the actuator brake is maintained in a power-off engaged state and detecting movement of the moveable component from a braked position.

12. The active transfer case of claim 11, wherein the power-operated clutch actuator includes an electric motor and the moveable component includes an armature shaft operable by the electric motor to drive the clutch actuation mechanism, and wherein the active brake functionality check includes energizing the electric motor while the actuator brake is maintained in its power-off engaged state and detecting whether the armature shaft has rotated from its braked position.

13. The active transfer case of claim 12, wherein the power-operated actuator brake further includes a magnetic brake disc, an electromagnetic coil, and a brake spring each defining a central aperture sized to permit the armature shaft to pass therethrough.

14. The active transfer case of claim 13, wherein the power-operated actuator brake further includes a drive plate in common rotation with the armature shaft.

15. The active transfer case of claim 14, wherein the "active" brake functionality check further includes placing the coil in a de-energized state such that the brake spring forcibly biases the brake disk with the drive plate and places the power-operated actuator brake into the power-off engaged state, whereby the armature shaft is braked against rotation.

16. The active transfer case of claim 15, wherein the "active" brake functionality check further includes energizing the coil such that a magnetic force is generated and retracts the brake disc out of engagement with the drive plate and places the power-operated actuator brake in the power-on released state.

17. The active transfer case of claim 16, wherein a method for conducting the active brake functionality check includes the steps of:
requesting clutch assembly engagement;
releasing the actuator brake and energizing the electric motor to drive the armature shaft to a position corresponding to the clutch engagement request;
de-energizing the electric motor and de-energizing the actuator brake so as to shift the actuator brake into its power-off engaged state;
determining a desired braked position (P1) of the motor shaft;
mechanically holding the motor shaft in an actual position (P2) as determined by a position sensor;
calculating a difference value P1—P2;
determining if the difference value between P1 and P2 exceeds a threshold value; and
notifying vehicle operator if difference value P1—P2 exceeds threshold value.

18. The active transfer case of claim 17, wherein the method for conducting the active brake functionality check further including the steps of:
re-energizing the electric motor in attempt to rotate the motor shaft while actuator brake is engaged;
determining a check position (P3) of the armature shaft;
calculating a difference value P1—P3;
comparing difference value to threshold value; and
determining a malfunction of the actuator brake if the difference value is greater than the threshold value.

19. The active transfer case of claim 18, wherein the method for conducting the active brake functionality check further including the steps of:
notifying vehicle operator if difference value P1—P3 exceeds threshold value.

20. The active transfer case of claim 19, wherein the method for conducting the active brake functionality check further including the steps of:
repeating the brake functionality check if difference value P1—P3 is below threshold value.

21. A method for conducting the active brake functionality check in an active transfer case configured for use in a 4WD motor vehicle to permit "on-demand" transfer of drive torque from a powertrain to an output shaft using a clutch assembly and an actuator brake, the method including the steps of:
requesting a clutch assembly engagement between the clutch assembly and the output shaft;
releasing the actuator brake and energizing an electric motor to drive a motor shaft to a position corresponding to the clutch engagement request;
de-energizing the electric motor and de-energizing the actuator brake so as to shift the actuator brake into a power-off engaged state;
determining a desired braked position (P1) of the motor shaft;
re-energizing the electric motor in attempt to rotate the motor shaft while actuator brake is engaged;
determining a check position (P3) of the motor shaft;
calculating a difference value P1 —P3;
comparing difference value to threshold value; and
determining a malfunction of the actuator brake if the difference value is greater than the threshold value.

* * * * *